US009176938B1

(12) United States Patent
Kerschen et al.

(10) Patent No.: US 9,176,938 B1
(45) Date of Patent: Nov. 3, 2015

(54) DOCUMENT REFERENCING SYSTEM

(75) Inventors: Paul Kerschen, Palo Alto, CA (US); Nicholas Zeltzer, Mountain View, CA (US)

(73) Assignee: LawBox, LLC, San Francisco, CA (US)

( * ) Notice: Subject to any disclaimer, the term of this patent is extended or adjusted under 35 U.S.C. 154(b) by 445 days.

(21) Appl. No.: 13/053,152

(22) Filed: Mar. 21, 2011

Related U.S. Application Data

(60) Provisional application No. 61/434,299, filed on Jan. 19, 2011.

(51) Int. Cl.
G06F 17/30 (2006.01)
G06F 17/22 (2006.01)

(52) U.S. Cl.
CPC ...... *G06F 17/2235* (2013.01); *G06F 17/30011* (2013.01); *G06F 17/30014* (2013.01); *G06F 17/30722* (2013.01); *G06F 17/30728* (2013.01)

(58) Field of Classification Search
CPC ... G06F 17/24; G06F 17/241; G06F 17/2735; G06F 17/30728; G06F 17/30011; G06F 17/30014; G06F 17/2235; G06F 17/30722
USPC .......................................... 707/621, 610, 695
See application file for complete search history.

(56) References Cited

U.S. PATENT DOCUMENTS

| 7,529,756 | B1 * | 5/2009 | Haschart ........... G06F 17/30728 |
| 7,849,193 | B1 * | 12/2010 | Goel ................. G06F 17/30887 709/219 |
| 2002/0095418 | A1 * | 7/2002 | Honda .............. G06F 17/30011 |
| 2003/0187733 | A1 * | 10/2003 | Hertling et al. ................. 705/14 |
| 2004/0117337 | A1 * | 6/2004 | Beck ....................... G06Q 10/10 |
| 2005/0149851 | A1 * | 7/2005 | Mittal ......................... 715/501.1 |
| 2006/0047656 | A1 * | 3/2006 | Dehlinger .......... G06F 17/30722 |
| 2006/0064394 | A1 * | 3/2006 | Dettinger et al. .................. 707/1 |
| 2006/0112085 | A1 * | 5/2006 | Zijlstra et al. ..................... 707/3 |
| 2007/0172062 | A1 * | 7/2007 | Waldo et al. .................. 380/252 |
| 2007/0208719 | A1 * | 9/2007 | Tran .................................. 707/3 |
| 2007/0211071 | A1 * | 9/2007 | Slotznick et al. ............. 345/594 |
| 2008/0034000 | A1 * | 2/2008 | Waldo .................... G06Q 10/10 |
| 2008/0059538 | A1 * | 3/2008 | Engel ............................ 707/201 |
| 2008/0086680 | A1 * | 4/2008 | Beckman ...................... 715/230 |
| 2008/0172738 | A1 * | 7/2008 | Bates et al. ..................... 726/22 |

(Continued)

OTHER PUBLICATIONS

EndNote® version 8.0, Thomson™, Copyright © 1988-2004 (hereinafter EndNote), pp. 1-88.*

(Continued)

*Primary Examiner* — Thanh-Ha Dang
(74) *Attorney, Agent, or Firm* — Neal, Gerber & Eisenberg LLP

(57) ABSTRACT

A document referencing system and method for operation are disclosed. The system encompasses an application for use on a standalone computing device housing a device library, which may be used in concert with a system library. The application may also collect references from external sources upon request, and may add these references to the system or device libraries. The device library is periodically updated by the application through connection to the system library. The application also provides a novel interface for searching for and identifying references housed within either the device or system libraries. The application also comprises software for detecting citations to external references within a document, and for reformatting the document to contain links to those external references as they exist in either the device or system libraries.

9 Claims, 34 Drawing Sheets

(56) References Cited

U.S. PATENT DOCUMENTS

| | | | |
|---|---|---|---|
| 2008/0178077 A1* | 7/2008 | Boucher | G06F 17/30728 715/266 |
| 2009/0234816 A1* | 9/2009 | Armstrong | 707/3 |
| 2010/0325211 A1* | 12/2010 | Ylinen et al. | 709/205 |
| 2010/0332305 A1* | 12/2010 | Higgins et al. | 705/14.16 |
| 2011/0093403 A1* | 4/2011 | Waldo et al. | 705/318 |
| 2011/0151837 A1* | 6/2011 | Winbush, III | 455/412.1 |
| 2011/0202848 A1* | 8/2011 | Ismalon | 715/738 |
| 2011/0219291 A1* | 9/2011 | Lisa | 715/207 |
| 2012/0072422 A1* | 3/2012 | Rollins | G06F 17/2745 707/737 |
| 2014/0067925 A1* | 3/2014 | Strong et al. | 709/203 |

OTHER PUBLICATIONS

LexisNexis.com Media Press Release dated Jan. 18, 2011.

* cited by examiner

DOCUMENT REFERENCING SYSTEM

CROSS-REFERENCE TO RELATED APPLICATION

This non-provisional patent application claims priority to U.S. Provisional Patent Application No. 61/434,299, filed on Jan. 19, 2011, entitled "DOCUMENT REFERENCING SYSTEM", which is hereby incorporated herein by reference in its entirety.

TECHNICAL FIELD

This invention relates generally to computer applications, and more specifically, to applications for providing subscription data and research services to user's of computer devices via a remote server.

BACKGROUND OF THE INVENTION

Many fields of research and many professional disciplines rely upon original writing that is heavily supported by citation or reference to prior writings. Such citations are often essential in order to provide credibility to the points raised in the original writing. The weight or importance of the cited references may dictate how well the reader will accept the premise being posited in the original writing. In other instances, references to other data sources are provided to the reader to assist the reader in further investigating the point raised or the topic discussed. Whether provided as footnotes, endnotes, or embedded within the text of the original writing document, citations form a critical part of professional writing across numerous fields such as, for instance, legal, medical, engineering, science, and even various business disciplines. In fact, the practice is commonplace in any discipline where a body of written knowledge has been created and is publicly available such that it may be referenced.

As a reader of original writing in such professional disciplines, it is quite often necessary to investigate the cited references. For example, someone conducting research may require more information about a topic than is provided in the original writing, and may want to review some of the cited materials to gain a more full understanding. In other cases, the reader may want to verify the accuracy of the citation, or to determine if the citation actually supports the premise in the original writing for which it is being used. Traditionally, the public availability of reference materials was through a physical library. If a source was cited in a document and a reader wanted to evaluate that source, the reader would need to obtain a physical copy of the source, such as from a research library. As the Internet has evolved, the text of many cited references may be accessed over a computer network. In some cases, the references may be found posted on publicly available websites. In other cases, they may be obtained through paid subscription services from privately managed reference consolidation databases, such as those maintained by LEXIS and WESTLAW.

Though Internet searching and reference consolidation databases have made it much easier to obtain and review cited references, it can still be a formidable and expensive task. First, at a minimum, a robust Internet connection is required to locate the references. Such connections are now almost universal in the workplace through desktop computers, but mobile connectivity through wireless devices may be unavailable at times or cost prohibitive. For example, if an Internet connection is available at all during airline flight, it is through an expensive and inefficient airlink service. Even on the ground, many remote areas have little or no wireless connectivity. Still other areas, such as certain public buildings, may employ devices to purposefully block wireless Internet connections. Furthermore, because most research is done via desktop, the websites available to access reference consolidation databases are poorly adapted for interface with handheld devices having smaller screen displays. Navigating and executing complex searches with a mobile device on the standard content websites can be difficult or impossible as those websites are set up. Where mobile-specific websites are available, functionality and content is severely limited.

Even where desktops are available or connectivity is not a concern, the process of obtaining the cited references for review is cumbersome and inefficient. First, the reader must identify the citations within the original writing and must manually type or paste them into a search field. With luck, the reference may be found in its entirety on the public Internet. More likely, however, the searcher will only waste valuable time concluding that this is not the case. The searcher must then log into a fee-based reference consolidation database such as LEXIS or WESTLAW and conduct a search for the reference. Though the reference may be available through such services, there is further cost and time involved in locating it. This expense of time and money must then be multiplied by the number of citations within the document that the reader chooses to pursue or evaluate. In addition, once a reader has resorted to a paid subscription service, there is no way to know what related resources may also be available for free on the Internet. For example, a search on a fee-based reference consolidation database for a cited reference that is unavailable on the public Internet may lead the searcher to other related references offered through the fee-based database that are publicly available on the Internet. Furthermore, searches conducted through services such as LEXIS and WESTLAW are limited to the material within the libraries they manage and update. They do not dynamically search the larger internet to pull in relevant content, such as, for instance, from Internet blog websites.

SUMMARY OF THE INVENTION

The present invention overcomes the above-cited limitations in the prior art by providing an application to assist the reader in quickly identifying and accessing cited references within an original writing. In many cases, no Internet connection may be necessary at all. This is because common references are stored in a device library on the reader's device. The contents of this device library are automatically updated and maintained by a web server that manages a much larger, system library. If the application recognizes a citation to a reference that is not present in the device library, the reference may still be obtained from the system library. A user may search directly for a reference through connection to the document referencing server. The application can also scan a document to identify citations using a cross-platform language interpretation tool that can then convert the citations into hyperlinks targeting at the cited references. In the preferred embodiment, the application will first attempt to locate the cited references in the device library. If found, the hyperlink will load the content on the device without need to connect to the Internet. If not found in the device library, the application will connect to the Internet and query the system library for the reference in order to generate the correct hyperlink. A user interface is provided that allows for complete functionality and utility through most handheld devices.

In one embodiment, the invention comprises a research system application wherein digital device libraries containing material within a pre-designated set may be housed on user devices, but maintained and updated remotely from a digital system library. The digital system library may be accessed by the application through the Internet to review material outside of the pre-designated set, or to search for related references or commentary on the public Internet. Content located may be instantly attached to an email, linked to a social network post, or otherwise shared with other system users.

In another embodiment, the invention comprises a research system application for remotely maintaining an organized and linked digital device library of frequently used references on a user device. Content of the device library is dictated by several factors, such as source of the reference, frequency of use of the reference, and user device memory capability. As references within the system library are updated by their source, a message is sent to the user and the application downloads and replaces the version of the reference in the device library. This may be done by user command or automatically upon reconnection of the user device to the web server. Where requested references are not found within the device library, the application connects to a system library on the web server to obtain the reference.

In yet another embodiment, the invention comprises a research system application for analyzing and reformatting a document contained within a computer file in a manner allowing the document to be displayed with cited references transformed into hyperlinks. Selecting the hyperlinks within the document causes the cited references to appear on screen. The cited references may be stored in a device library housed on the device being used to view the document, or may be downloaded from a system library through an Internet connection to a web server housing a component of the research system application.

In still another embodiment, the invention comprises a research system application navigating sets of docs which refer to one another by means of explicit citation. The application can recognize and activate citation references within a document, thus allowing the document to be dynamically linked to the cited references. When one of the cited references is selected, the research system application will display the cited reference, which it will obtain from either a device library located on the user device, or from a system library maintained by a remote web server. The research system application will format the cited reference in a like manner, causing it to appear with dynamic links to the references it cites.

While certain embodiments are mentioned above, numerous other embodiments, systems, methods, features, and advantages of the present invention will be, or will become, apparent to one having ordinary skill in the art upon examination of the following drawings and detailed description. All such additional systems, methods, features, and advantages included within this description, are within the scope of the present invention, and may be included in one or more of the accompanying claims. Though the research field of law is used as a primary example throughout the figures and written description below, one of skill in the art will recognize that the research system application could also be adapted for use in various other research fields, and that the invention described herein is not limited in any way to use with one particular field. In addition, though an Apple I-PHONE is used as a primary example of the user device in many of the figures, one of skill in the art will recognize that the user device could also be a desktop or other non-mobile computing device capable of generating a screen for viewing and interacting with the invention.

Thus, as will be further discussed in detail below, the present invention provides a new and useful software tool for reviewing professional writing documents, and conducting further research on related topics. The invention allows for quick, easy and efficient access to referenced materials within a written document, and allows a user to search for other materials upon request. By utilizing both a device and a system library, much of the application's functions may be conducted without a connection to the Internet. The search functions employed are uniquely designed to provide logical and relevant search results, and the application interfaces and structure of the libraries are constructed in a manner to allow complete functionality through most mobile devices.

DETAILED DESCRIPTION

Figure 1:
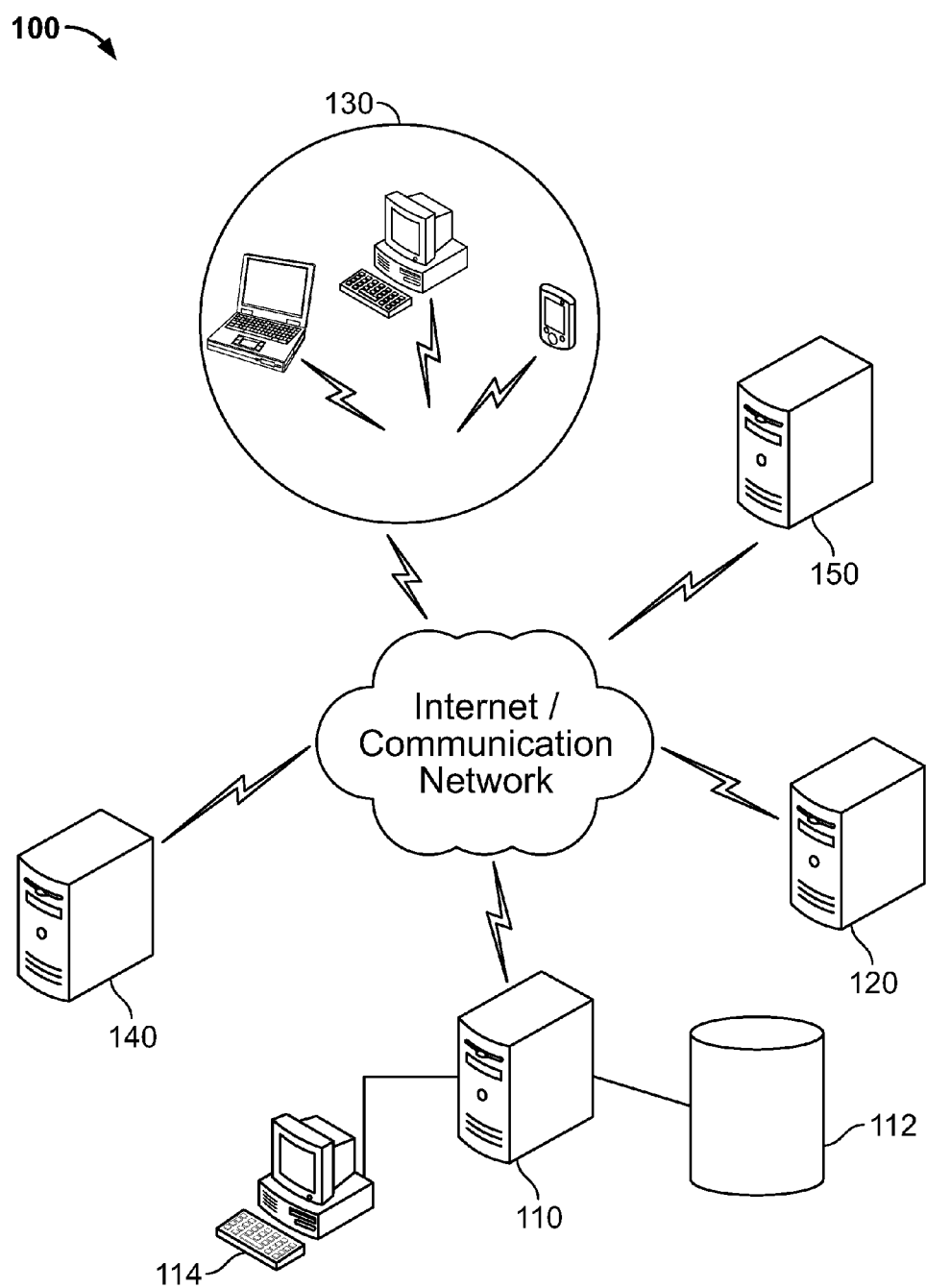
FIG. 1 is a graphical representation of hardware components that may be utilized or accessed by the document referencing system application.

The description that follows describes, illustrates and exemplifies one or more particular embodiments of the present invention in accordance with its principles. This description is not provided to limit the invention to the embodiments described herein, but rather to explain and teach the principles of the invention in such a way to enable one of ordinary skill in the art to understand these principles and, with that understanding, be able to apply them to practice not only the embodiments described herein, but also other embodiments that may come to mind in accordance with these principles. The scope of the present invention is intended to cover all such embodiments that may fall within the scope of the appended claims, either literally or under the doctrine of equivalents.

It should be noted that in the description and drawings, like or substantially similar elements may be labeled with the same reference numerals. However, sometimes these elements may be labeled with differing numbers, such as, for example, in cases where such labeling facilitates a more clear description. Additionally, the drawings set forth herein are not necessarily drawn to scale, and in some instances proportions may have been exaggerated to more clearly depict certain features. Such labeling and drawing practices do not necessarily implicate an underlying substantive purpose. As stated above, the present specification is intended to be taken as a whole and interpreted in accordance with the principles of the present invention as taught herein and understood to one of ordinary skill in the art.

FIG. 1 is a graphical representation of a computer-based or implemented document referencing system 100. The system includes a plurality of hardware elements that may be utilized in system operation. Though the present invention is adapted to perform with full functionality on most presently available handheld communication devices, it is evident from FIG. 1 that the user device 130 through which a user may interact with the document referencing system 100 may take the form of a laptop or a desktop as well. As explained below, once the proper application has been installed, certain functions of the invention may be performed on user device 130 without connection to external devices. However, certain functions require connection to other devices through the internet or other networks as shown. The principal connection is between user device 130 and document referencing server 110, from which the component of document referencing system application 200 housed on user device 130 is obtained and from which the device library is updated. Document referencing server 110 is, in turn, connected to a system library database 112 where the system library is housed. Server 110 may also be connected to a document referencing system administrator device 114, which can be used by system administrators to update protocols and instructions on the server 110.

The document referencing system 100 may also interact with other devices, such as public server 140, private server 150, and access gateway server 120. In some embodiments, requests from user device 130 to document referencing server 110 will first have to be authenticated by access gateway server 120. This may be the case, for instance, where a subscription service has been set up for all employees or members of a group, and the company or group organization provides access to the document referencing server 110. The access gateway server 120 authenticates the user of the querying user device 130 as an employee or group member before passing the query along.

Public server 140 represents any one of millions of web servers that may contain documents sought by a query from user device 130. As will be explained, the document referencing system application 200 will first search the device library on the user device 130 for a cited or requested reference. If the reference is not found in the device library, application 200 will connect to document referencing server 110 and request the reference. If the reference is not on document referencing server 110, the application 200 will search for the document, or use existing public search engines for this purpose, to locate the document on one of the public servers 140.

If the reference is located on a public server 140, it is downloaded by the document referencing server 110 and stored in system library database 112 for future reference. If the cited reference cannot be located on any public servers 140, the document referencing server 110 may request access to certain private servers 150 that are likely to have the reference, and download/store it in similar fashion if it is located, such that it need not be obtained in such a manner in the future.

Figure 2:
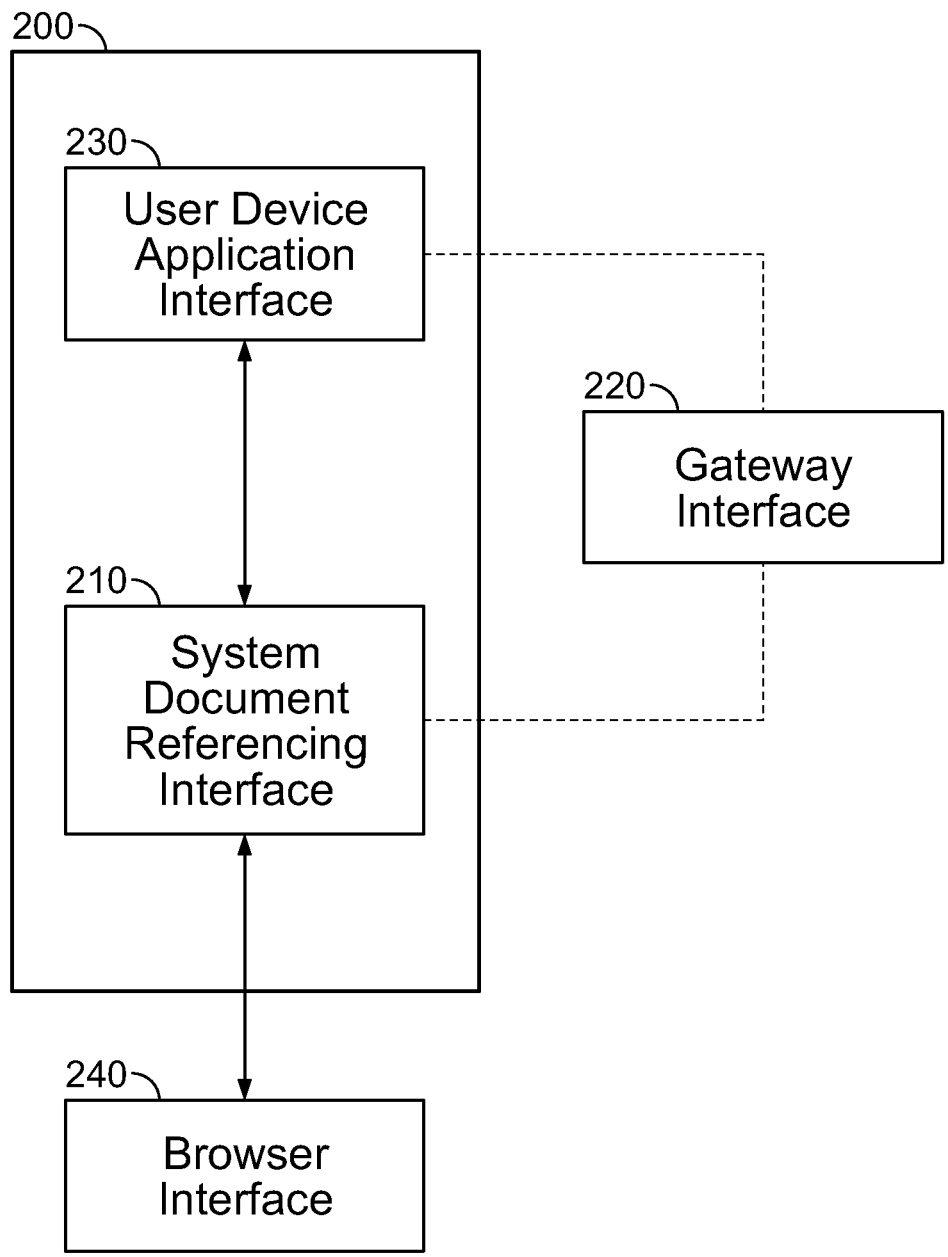
FIG. 2 is a block diagram of certain application interfaces utilized and/or presented by the document referencing system application.

FIG. 2 illustrates the interfaces presented by the various devices through the connections discussed above in association with FIG. 1. The document referencing system application 200 presents user device interface 230 on the user device 130 to allow the user to interact with the application 200 and the document referencing server 110. Through the interne, document referencing server 110 presents additional features and options to the user using document referencing interface 210. In some embodiments, interface 210 takes on a form unique from user device interface 230; however, it is preferred that interface 210 is highly similar or identical to, and is controlled through the same command functions and in the same manner as, user device interface 230 so as to appear seamless to the user. In these embodiments, the user interface may simply be referred to as the document referencing system interface.

In embodiments where an access gateway server 120 is employed, the user may be presented with a gateway interface 220, such as a login tool, presented by the gateway server 220. Finally, as discussed below, the document referencing system application 200 is also adapted to present to the user the actual source material located through any search beyond the bounds of system library server 112 in the source material's native form. Thus, if a reference is located on a public server 140, it may be presented upon request to the user as it appears through the Internet on that public server using browser interface 240.

Figure 3:
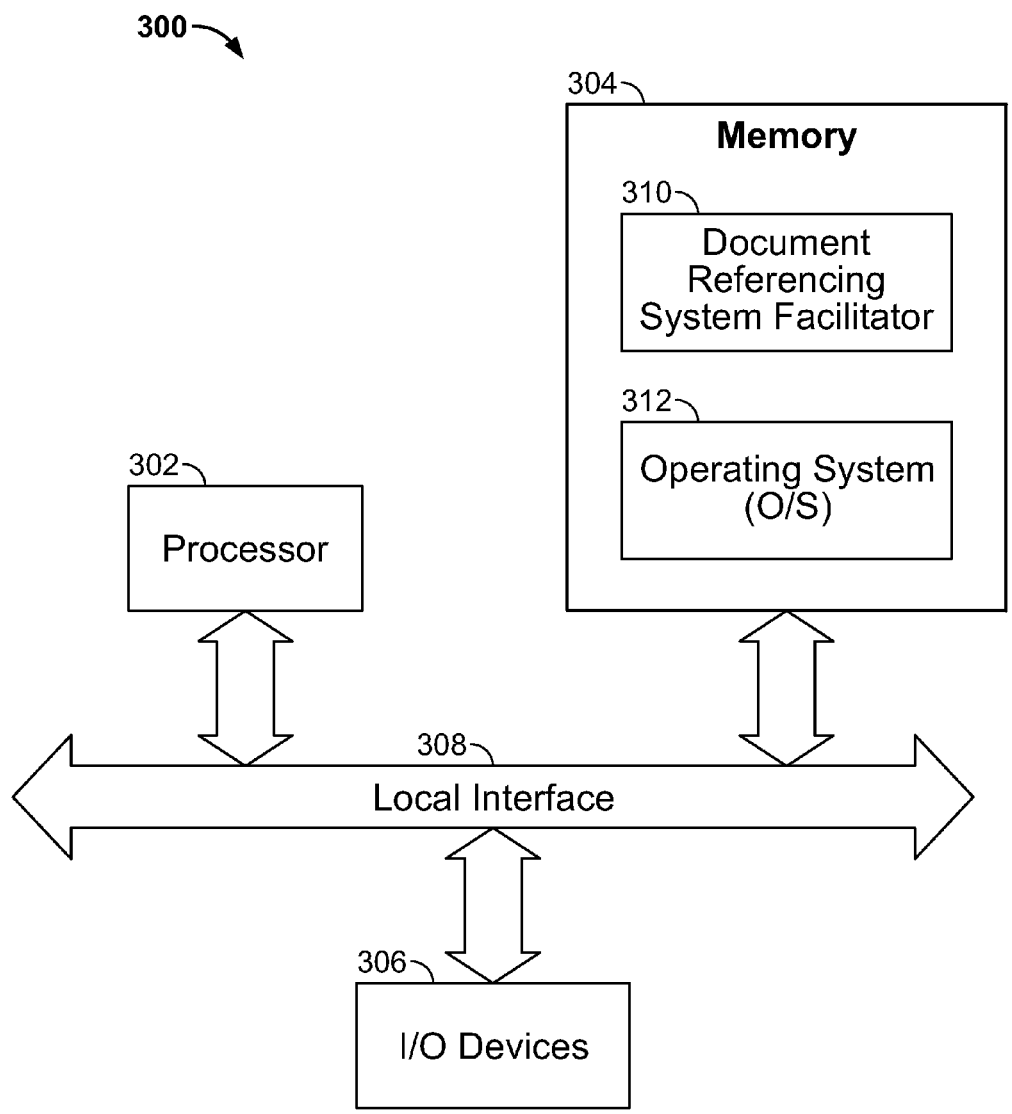
FIG. 3 is a block diagram of one form of a computing device of FIG. 1, having a memory element with a computer readable medium for implementing the activities proscribed by the document referencing system application.

FIG. 3 is a block diagram of a computing device 300 housing executable software used to facilitate the document referencing system 100. Computing device 300 may be any one of the document referencing server 110, the document referencing system administrator device 114, an access gateway server 120, a user device 130, a public server 140, and/or a private server 150 from FIG. 1. Though all of these computing devices contain executable software, in the preferred embodiment, the user device 130 and the document referencing server 120 also comprise software unique to the document referencing system 100, referred to herein as document referencing system application 200. For these devices, this software is a component of document referencing system facilitator 310. However, document referencing system facilitator 310 may also comprise other software to enable full functionality of the document referencing system 100 as described below, such as, for instance, a standard Internet browsing interface application. Computing device 300 may include a memory element 304. Memory element 304 may include a computer readable medium for implementing the document referencing system 100, and for implementing particular system transactions.

In other embodiments, the document referencing system facilitator 310 may be implemented in software, firmware, hardware, or any combination thereof. For example, in one mode, the document referencing system facilitator 310 is implemented in software, as an executable program, and is executed by one or more special or general purpose digital computer(s), such as a personal computer (PC; IBM-compatible, Apple-compatible, or otherwise), personal digital assistant, handheld computing device, workstation, minicomputer, mainframe computer, computer network, "virtual network" or "internet cloud computing facility". Therefore, computing device 300 may be representative of any computer in which the document referencing system facilitator 310 resides or partially resides, such as the document referencing server 110 of FIG. 1.

Generally, in terms of hardware architecture as shown in FIG. 3, computing device 300 includes a processor 302, a memory 304, and one or more input and/or output (I/O) devices 306 (or peripherals) that are communicatively coupled via a local interface 308. Local interface 308 may be, for example, but is not limited to, one or more buses or other wired or wireless connections, as is known in the art. Local interface 308 may have additional elements, which are omitted for simplicity, such as controllers, buffers (caches), drivers, repeaters, and receivers, to enable communications. Further, local interface 308 may include address, control, and/or data connections to enable appropriate communications among the other computer components.

Processor 302 is a hardware device for executing software, particularly software stored in memory 304. Processor 302 can be any custom made or commercially available processor, a central processing unit (CPU), an auxiliary processor among several processors associated with computing device 300, a semiconductor based microprocessor (in the form of a microchip or chip set), another type of microprocessor, or generally any device for executing software instructions. Examples of suitable commercially available microprocessors are as follows: a PA-RISC series microprocessor from Hewlett-Packard Company, an 80x86 or Pentium series microprocessor from Intel Corporation, a PowerPC microprocessor from IBM, a Sparc microprocessor from Sun Microsystems, Inc., or a 68xxx series microprocessor from Motorola Corporation. Processor 302 may also represent a distributed processing architecture such as, but not limited to, SQL, Smalltalk, APL, KLisp, Snobol, Developer 200, MUMPS/Magic.

Memory 304 can include any one or a combination of volatile memory elements (e.g., random access memory (RAM, such as DRAM, SRAM, SDRAM, etc.)) and nonvolatile memory elements (e.g., ROM, hard drive, tape, CDROM, etc.). Moreover, memory 304 may incorporate electronic, magnetic, optical, and/or other types of storage media. Memory 304 can have a distributed architecture where various components are situated remote from one another, but are still accessed by processor 302.

The software in memory 304 may include one or more separate programs. The separate programs comprise ordered listings of executable instructions for implementing logical functions. In the example of FIG. 3, the software in memory 304 may include the document referencing system facilitator 310 in accordance with the present invention, and a suitable operating system (O/S) 312. A non-exhaustive list of examples of suitable commercially available operating systems 312 is as follows: (a) a Windows operating system available from Microsoft Corporation; (b) a Netware operating system available from Novell, Inc.; (c) a Macintosh operating system available from Apple Computer, Inc.; (d) a UNIX operating system, which is available for purchase from many vendors, such as the Hewlett-Packard Company, Sun Microsystems, Inc., and AT&T Corporation; (e) a LINUX operating system, which is freeware that is readily available on the Internet; (f) an I-Phone operating system available from Apple Computer, Inc.; or (g) an appliance-based operating system, such as that implemented in other handheld computers or personal digital assistants (PDAs) (e.g., PalmOS available from Palm Computing, Inc., or Windows CE available from Microsoft Corporation). Operating system 312 essentially controls the execution of other computer programs, such as the document referencing system facilitator 310, and provides scheduling, input-output control, file and data management, memory management, and communication control and related services.

The document referencing system facilitator 310 may be a source program, executable program (object code), script, or any other entity comprising a set of instructions to be performed. When a "source" program, the program needs to be translated via a compiler, assembler, interpreter, or the like, which may or may not be included within memory 304, so as to operate properly in connection with operating system 312. Furthermore, the document referencing system facilitator 310 can be written as (a) an object oriented programming language, which has classes of data and methods, or (b) a procedural programming language, which has routines, subroutines, and/or functions, for example but not limited to, C, C++, Pascal, Basic, Fortran, Cobol, Perl, Java, .Net, HTML, and Ada. As discussed further below, components of the advertising system facilitator 310 may also be written in a proprietary language developed to interact with these known languages.

I/O devices 306 may include input devices, for example but not limited to, input modules for PLCs, a keyboard, mouse, scanner, microphone, touch screens, interfaces for various medical devices, bar code readers, stylus, laser readers, radio-frequency device readers, etc. Furthermore, I/O devices 306 may also include output devices, for example but not limited to, output modules for PLCs, a printer, bar code printers, video displays, etc. Finally, I/O devices 306 may further comprise devices that communicate with both inputs and outputs, including, but not limited to, a modulator/demodulator (modem; for accessing another device, system, or network), a radio frequency (RF) or other transceiver, a telephonic interface, a bridge, a cellular communication part, or a router.

If computing device 300 is a PC, workstation, PDA, or the like, the software in memory 304 may further include a basic input output system (BIOS) (not shown in FIG. 3). The BIOS is a set of essential software routines that initialize and test hardware at startup, start operating system 312, and support the transfer of data among the hardware devices. The BIOS is stored in ROM so that the BIOS can be executed when computing device 300 is activated.

When computing device 300 is in operation, processor 302 is configured to execute software stored within memory 304, to communicate data to and from memory 304, and to generally control operations of computing device 300 pursuant to the software. The document referencing system facilitator 310 and operating system 312, in whole or in part, may be read by processor 302, buffered within processor 302, and then executed.

When the document referencing system facilitator 310 is implemented in software, as is shown in FIG. 3, it should be noted that the document referencing system facilitator 310 can be stored on any computer readable medium for use by or in connection with any computer related system or method, although in one preferred embodiment, the document referencing system facilitator 310 is implemented in a centralized application service provider (ASP) arrangement. In the context of this document, a "computer-readable medium" may be any means that can store, communicate, propagate, or transport the program for use by or in connection with the instruction execution system, apparatus, or device. The computer readable medium may be for example, an electronic, magnetic, optical, electromagnetic, infrared, or semiconductor system, apparatus, device, propagation medium, or any other device with similar functionality. More specific examples (a non-exhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical). Note that the computer-readable medium could even be paper or another suitable medium upon which the program is printed, as the program can be electronically captured, via, for instance, optical scanning of the paper or other medium, then compiled, interpreted or otherwise processed in a suitable manner if necessary, and then stored in a computer memory. The document referencing system facilitator 310 can be embodied in any type of computer-readable medium for use by or in connection with an instruction execution system, apparatus, or device, such as a computer-based system, processor-containing system, or other system that can fetch the instructions from the instruction execution system, apparatus, or device and execute the instructions.

In another embodiment, where the document referencing system facilitator 310 is implemented in hardware, the document referencing system facilitator 310 may also be implemented with any of the following technologies, or a combination thereof, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

For purposes of connecting to other computing devices, computing device 300 is equipped with network communication equipment and circuitry. In a preferred embodiment, the network communication equipment includes a network card such as an Ethernet card, or a wireless connection card. In a preferred network environment, each of the plurality of computing devices 300 on the network is configured to use the TCP/IP protocol to communicate with one another. It will be understood, however, that a variety of network protocols could also be employed, such as IPX/SPX, netware, PPP, and others. It will also be understood that while a preferred embodiment of the present invention is for each computing device 300 to have a broadband or wireless connection to the Internet, the principles of the present invention are also practicable with a dialup connection using a standard modem. Wireless connections using satellite, infrared and radio frequency networks are also contemplated.

As will be understood, certain aspects and functions of the document referencing system 100 can be performed in some embodiments without use of a device library, or any software specific to the document referencing system 100 on user device 130. For example, in a particular embodiment, user device 130 could utilize standard browsing software to interact with document referencing server 110, which could present the document referencing interface 210 directly through the browser interface on the user device 130. In this manner, the system library could be searched and scrolled through in a manner similar to that described below. However, this manner of system interaction is limited in that it requires a constant connection to the Internet or network. Thus, it is preferable that a component of the document referencing system application 200 be placed on user device 130 so as to enable the creation and use of a device library on the device 130, without connection to or reliance upon the document referencing server 100. Such will be considered the preferred embodiment, which enables the full functionality as described further below.

Figure 4:
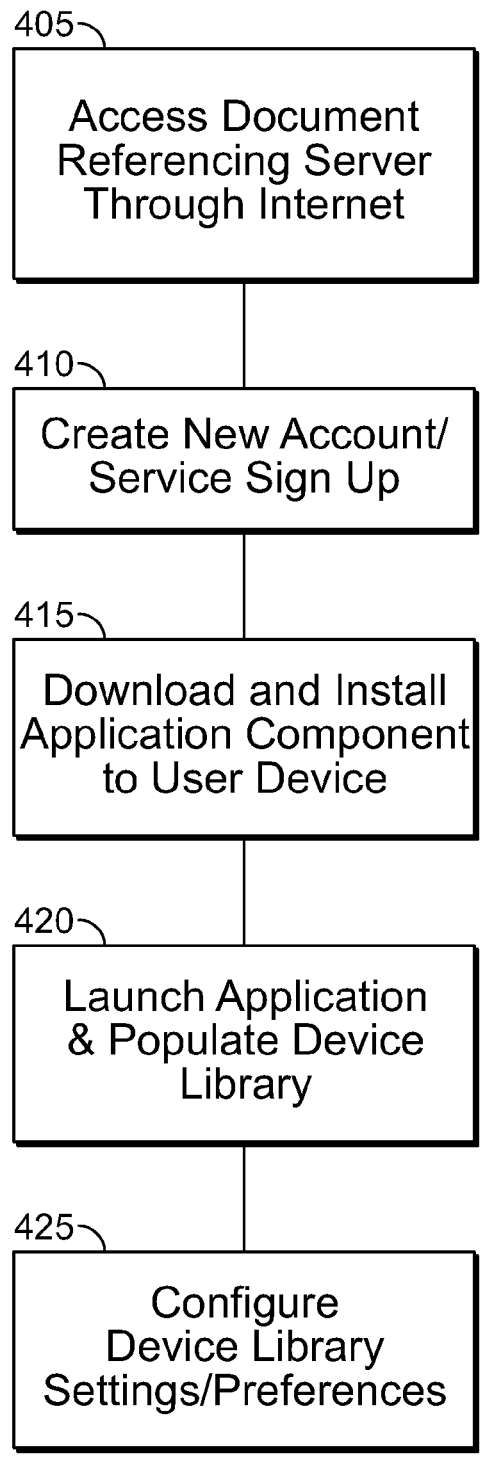
FIG. 4 is a flowchart showing steps involved in setting up the research system application for operation on a user device according to an exemplary embodiment.

Thus, before the document referencing system 100 may be used according to the exemplary embodiment described below, a component of the document referencing system application 200 must be installed and configured on user device 130. Though this may be done in a number of ways, FIG. 4 illustrates an example of how this is accomplished, and shows the steps associated with user account creation, according to one embodiment. At Step 405, a user accesses the document referencing server 110 through the Internet using a user device 130 equipped with standard browsing software. Using the browsing software to interact with the document referencing server 110, the user creates an account and signs up for service at Step 410. Step 410 will include a variety of sub-steps relating to the establishment of an account, methods of which are well known, such as, for instance, providing contact information, financial account information, verifying said financial account information, and selecting a distinctive username and password.

Once an account is created, Step 410 also may comprise a sub-routine for tailoring an account subscription package. Such routines are also known, and simply involve the user selecting from any number of subscription options programmed into the document referencing server 110 by a system administrator. For example, a user could elect to be billed a flat-rate fee monthly, a variable monthly rate based on usage, or simply be billed per download from the system library. In addition, a user may specify certain reference sets for common usage, such that access to materials within those reference sets is at a reduced rate, while access to materials outside that reference set is at a higher rate.

In cases where the user is an employee or group member of a company or group that has established a collective account for its employees or group members, the user may simply be issued a username and password, such as through an email message generated from the document referencing server 110. In that case, the user will not need to establish an account. Rather, the account parameters will have been pre-established and the user can simply log in and proceed to Step 415. Generally, in such group scenarios, the user will also not have the option of tailoring the subscription package, as that will also have been pre-established by the employer or group.

At Step 415, the user elects to download a component of the document referencing system application 200 onto user device 130. As previously explained, this allows document referencing system 100 to operate certain functions even without an Internet or network connection. Though document referencing system 100 is configured to operate with a wide variety of different user devices, the actual component of document referencing system application 200 downloaded may be tailored to specific operating systems or user device capability levels. The document referencing system application 200 housed on the document referencing server 110 may be configured to detect information about the user device and, thus, help select the appropriate application component for download.

Once the proper component of document referencing system application 200 is downloaded and installed on the user device 130, the user launches the application at Step 420. Upon startup, the application 200 will attempt to access a device library on user device 130 and will recognize that no such library has been created. The application 200 will then create the device library, which may be nothing more than a storage space within the memory 304 of the user device 130 that is associated with the application 200. The application 200 will also connect with document referencing server 110 to populate the device library with selected content. The memory capacity, or size, of the device library may be pre-established or may be set by the user, but is necessarily limited by the memory capacity of user device 130. This capacity will be considerably less than the capacity of system library database 112. Thus, the device library on user device 130 is used as a temporary repository for often used materials, while less often used materials may be obtained via network connection to system library database 112 through document referencing server 110.

Alternatively, the device library may be populated with a finite reference set, such as, for example, the contents of the Encyclopedia Britannica. When reference to material within this set is requested, document referencing system application 200 pulls it from the device library. When references outside of this set are requested, the application pulls them from the system library through server 110. In some embodiments, the contents to be placed in the device library are pre-established. For example, through a group membership program, the employer may specify the reference sets to be placed in each user's device library, and the user will have no control over this. In other embodiments, the application 200 itself may select or recommend the contents of the device library based on information provided by the user, such as the user's address, career discipline, research needs, etc.

In other embodiments, Step 420 may include an opportunity for the user to specify the contents of the device library. For example, if the user is a medical researcher, they may choose to include the New England Journal of Medicine within their device library. In such manner, any reference set may be selected for download from the universe of reference sets available on system library database 112. However, user device memory capacity must be taken into account in determining how many and which reference sets to download. In some embodiments, the system application 200 may provide the user updates as to the memory size required for download of certain reference sets versus the device memory available.

Another consideration in determining what to place in the device library is the cost of the reference set. Depending on the subscription, some reference sets may be included for free, while others may require an additional cost. As explained in detail below, it is envisioned that each reference set downloaded to the device library will be automatically updated and maintained by the document reference system application 200 as changes are made to the contents of the reference set. While this is the preferred default, lower cost options may be offered in some embodiments, such that a user can download a fixed-in-time reference set that will not be updated until the user requests an update for an additional cost.

To complete the installation process, the user may be given the opportunity at Step 425 to configure certain settings and preferences regarding how the device library is to be maintained by document reference system application 200. For example, the user may direct the application 200 to provide notification when material within the device library has been updated. This may simply be a listing of the reference sections that were updated, or may actually point out the changes made—such as through display of a redline document. The user may also set up rules for temporary retention of references obtained from the system library that are not within the reference set stored and maintained on the device library. This temporary cache within the device library may be managed based on a first in-first out methodology, by a frequency of reference use methodology or any other such parameters.

Figure 5:
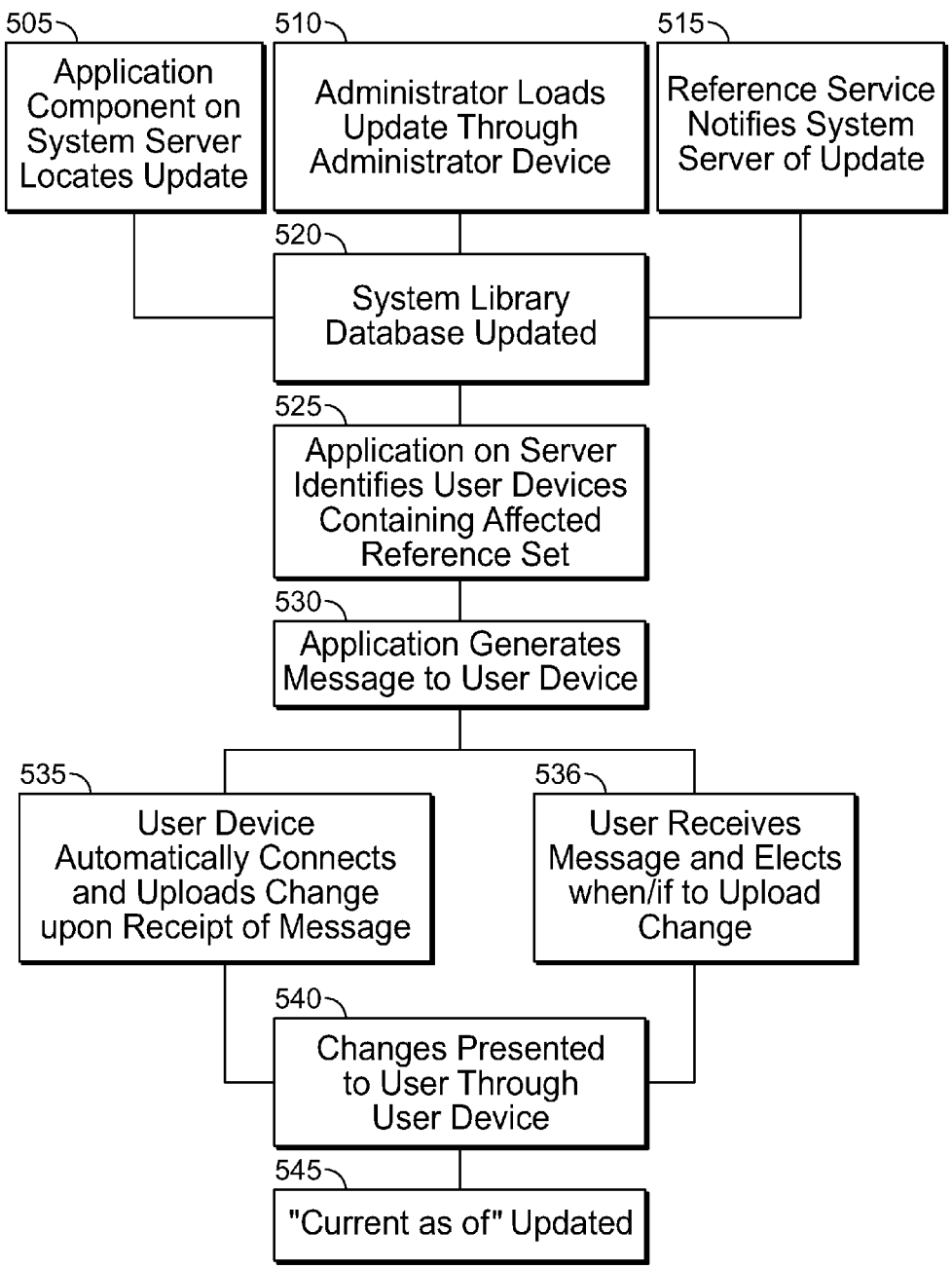
FIG. 5 is a flowchart showing steps involved in updating content within a device library on the user device, according to an exemplary embodiment.

Though maintenance of the device library on user device 130 may be performed in any variety of ways according to the parameters set by the application 200, the user, or the group/employer where applicable, the steps associated with this process according to an exemplary embodiment are provided in FIG. 5. Updates or changes to a given reference set may reach document referencing server 110 in a variety of ways, as illustrated by Steps 505, 510, and 515. Step 505 involves the server-based component of document referencing system application 200 actively searching for updated content across the Internet. Using the prior example of the New England Journal of Medicine, the application 200 might come across an article from the Journal that has been reproduced on the Internet. It does this by sending queries to various search engines and scanning the results for certain triggers and keys. If the application 200 locates content that it can positively associate with the source of the reference set on a publicly available website, and can verify that the content is not already stored on system library database 112, it can collect the new content. This content may be obtained under license if necessary.

This also works for version changes for references that are often republished with next editions. For example, if the system library database 112 has the full fifth edition of the Handbook of Pharmaceutical Excipients, and the application 200 recognizes that the sixth edition has been released and is available through the Internet, it may update the reference as described below. Alternatively, where a copy is not available through the Internet, but where the application 200 notes the release of an update, it may generate and transmit a message to document referencing system administrator device 114 so that an administrator may determine whether and how to obtain a copy of the new edition, such as, for example, through a separate licensing agreement.

In other cases, such as where the application administrator has subscribed to the reference set, the new or updated content may be sent directly to the document referencing server 110 from the content source, as shown in Step 515. If this service is not available from the content source, the administrator may receive the copy and manually upload it through administrator device 114, as shown at Step 510. In still other cases, the administrator may receive word of an update from users of the document referencing system application 200. For example, a user specializing in a narrow field or discipline may recognize that a reference set available through application 200 has become outdated before the system administrator becomes aware of this. In such cases, the users may bring this to the attention of the administrator so that the new content may be obtained.

Regardless of how the new content is identified and received by document referencing system application 200, the application then updates the affected reference set in the system library database 112 at Step 520. From there, at Step 525, the document referencing system application 200 proceeds to determine which system subscribers have subscribed to the affected reference set, or in other words, have chosen to maintain the affected reference set within their respective device libraries on their user devices 130. Application 200 maintains a record of this information for a variety of purposes, such as account maintenance, billing, and system updates. The application 200 will then generate and send a message to the identified subscribers at Step 530. This message could be in the form of an email, an SMS text message, or any other known means of messaging. Thus, taking the example from above, application 200 would recognize the system users that have subscribed to (or placed within their device libraries a copy of) the Handbook of Pharmaceutical Excipients, and would send a text message to their user devices 130 advising them that a new edition is available for download from the system library database 112.

From this point in the process, according to the exemplary embodiment, the step taken to actually update the device library on a given user device 130 will depend on how the corresponding user has configured their account. If they signed up for automatic updating, the user will not need to take any action. Rather, as shown in Step 535, the user device 130 will connect to the document referencing server 110 at the first availability of an appropriate Internet connection and will download the updated reference material automatically. Alternatively, if the user did not elect to receive automatic updates, the user will have to make a determination, upon receiving the message at Step 530, whether or not the identified update is worth obtaining. If so, the user connects user device 130 to the server 110 and obtains the updated reference material through a separate transaction at Step 536.

Though not necessary, at Step 540 the exemplary embodiment presents the changes or edits between the version previously within the device library on the user device 130 and the one downloaded. This may be done in a colored or marked-up format in a separate document so that the user may quickly evaluate the level of updates made, and may proceed to evaluate the specific updates if they so choose. This markup preferably compares the latest downloaded version to the version that it replaced in the device library of the user device 130. This may or may not be the immediately prior version. For example, if the device library contained the fourth edition of a reference and the user did not elect to update to the fifth edition when it became available, but now has updated to the sixth edition, the comparison would show changes between the fourth and sixth edition.

In other embodiments, a summary of the level of changes between the newly available version and the version in a given user's device library will be presented to the user at Step 530. This functionality will help users that have not subscribed to automatic updates make a sound determination of whether to obtain the new version of the reference. Obviously in cases where the reference set is cumulative (e.g., the New England Journal of Medicine) as opposed to reissued (e.g., the next edition of the Handbook of Pharmaceutical Excipients), the update will not be replacing content in the device library, but rather supplementing it. In such cases, Step 540 will be bypassed. Finally, as shown in Step 545, the application 200 will instruct the user device 130 to reflect the latest download date on materials within the device library when they are viewed.

FIGS. 6-28 and 31-33 depict document referencing system 100 in operation on a user device 130, which happens to be a mobile device, according to a specific embodiment. As previously discussed, system 100 has a variety of applications across numerous disciplines, and can be used in association with various types of user devices. As an example only, the following description discusses the system 100 as it might be used in the legal discipline, and specifically for maintaining legal reference sets. Document referencing system 100 is well-suited for use in the legal field because it is very common in that field for documents to reference or cite to other references. It is also common for legal reference sets to be updated or accumulated. For example, the laws or legal statutes themselves are often changed as Congress or a state legislature recognizes the need for modifications. Meanwhile, courts continuously generate new cases which may guide and instruct on the interpretation of the law. Thus, a statute-based reference set would be one subject to revision (such as the Handbook of Pharmaceutical Excipients from above, and referred to herein as a "revision set"), whereas a reference set based on the case law from a certain court or set of courts would be subject to accumulation (such as the New England Journal of Medicine, and referred to herein as an "accumulation set"). In some cases, an accumulation set grows at a rate that makes it infeasible to contain within a device library. However, in some embodiments, document referencing system application 200 may still retain a temporary cache of a portion of such reference sets.

Figure 6:
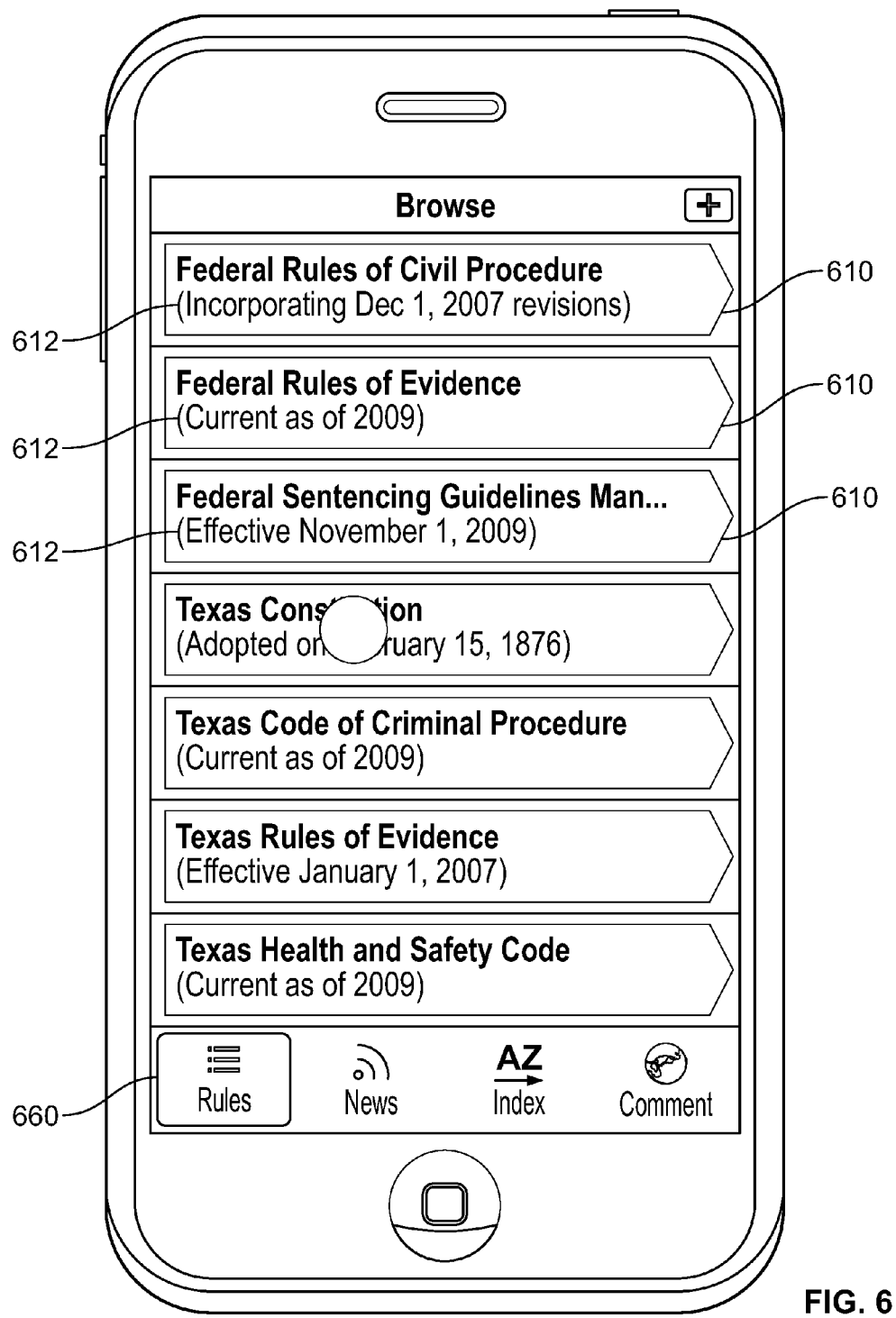
FIG. 6 is a first view of topics within a device library on a user device operating the research system application, in accordance with a particular embodiment.

FIG. 6 shows a screen view of a handheld user device 130 that is using document referencing system 100. Specifically, this view shows a listing of certain contents within the device library contained on this user device 130. As shown, the device library contains numerous reference sets 610 that a lawyer in the State of Texas might find useful. Where applicable, reference sets 610 provide a currency label 612 to inform the user of the date that the particular reference set was last downloaded from the system library database 112. In the featured embodiment, the depicted device library contents are all statutes (revision sets), and are listed on the "Rules" menu 660. This menu, which may have other names in different embodiments, simply lists the contents of the device library, and can be tailored to fit the needs of the individual user. The other menus will be discussed below.

Figure 7:
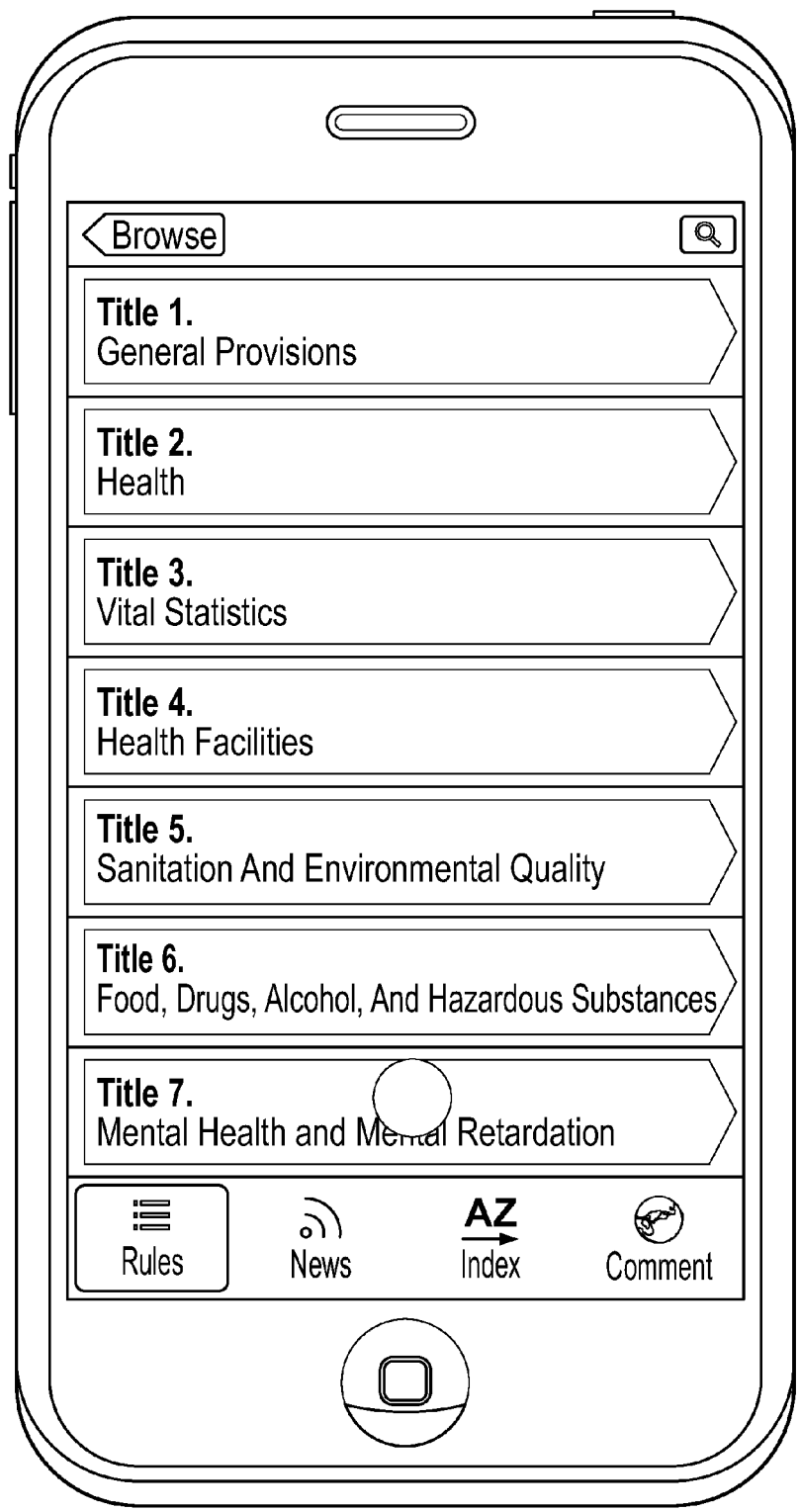
FIG. 7 is a second view of topics within a device library on a user device operating the research system application, in accordance with a particular embodiment.
Figure 8:
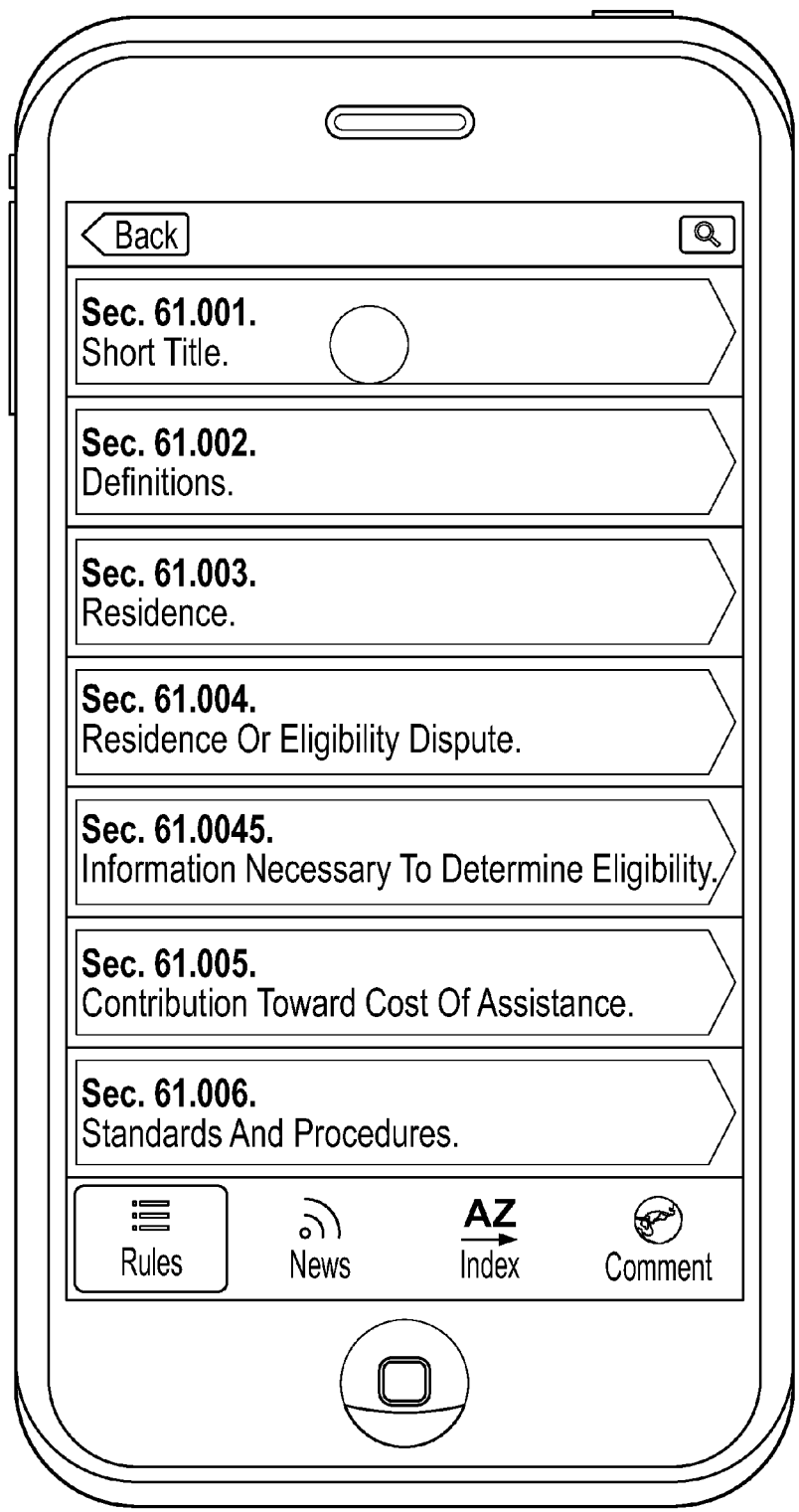
FIG. 8 is a third view of topics within a device library on a user device operating the research system application, in accordance with a particular embodiment.
Figure 9:
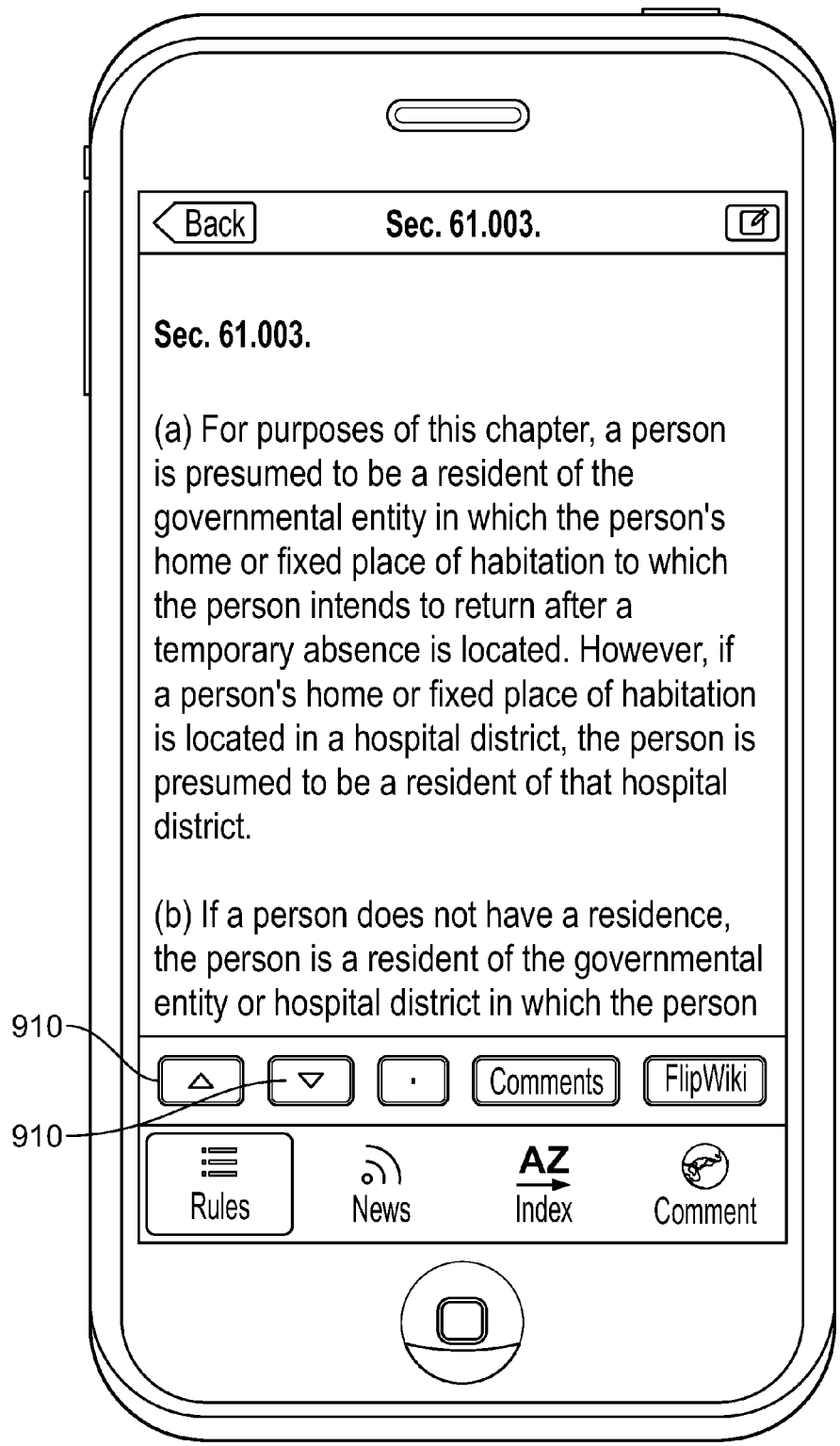
FIG. 9 is a screen shot of a user device operating the research system application that shows a specific reference, in accordance with a particular embodiment.

Often, large reference sets are organized in an hierarchical structure such that each lower level contains more specific material of a nature related to the topic or component selected from a list at the level just above. Legal statutes conform to this model and provide a good example. A single reference set may contain various statutes, each of which contains multiple sections, each section, in turn, containing multiple subsections, etc. Document referencing system 100 is well suited to handle such a structure, as shown in FIGS. 6-9. From FIG. 6, when a user selects the "Texas Health and Safety Code" reference set, document referencing system application 200 operating on user device 130 will list the titles within that code, as shown in FIG. 7. If Title 7 is selected, application 200 will display the sections within that title, as shown in FIG. 8. Finally, if a specific section is selected, application 200 will display the content of that section, verbatim, as it is stored in the device library of user device 130, as shown in FIG. 9. The number of levels involved is dictated by the structure of the reference set itself.

Figure 10:
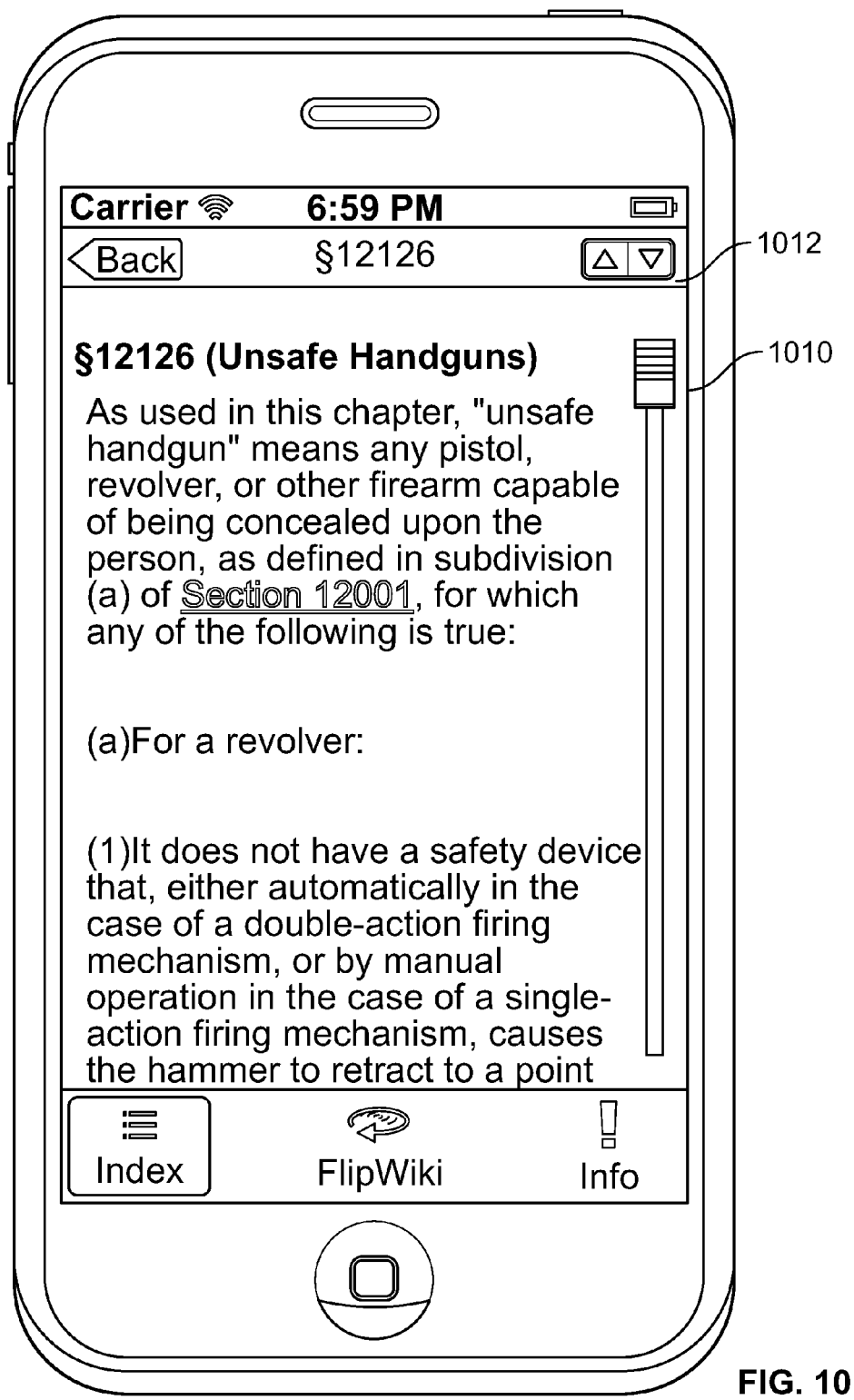
FIG. 10 is a screen shot of a user device operating the research system application that shows a specific reference, in accordance with another embodiment.

As shown in FIG. 9, application 200 presents the content of the document in a readable format. Where this causes the format to extend beyond the screen display, arrow buttons 910 are provided to scroll through the document. An example of a different document selected using a different user device 130 is shown in FIG. 10. In this embodiment, arrow buttons 910 are replaced by a slip bar 1010 along the right hand side. However, scroll buttons 1012 are new, and allow a user to scroll numerically through sequential documents. For example, selecting the down scroll button 1012 will cause application 200 to load and display Section 12127 of the applicable reference set, and so forth. Also apparent in FIG. 10 is that the mention of "Section 12001" within the document is highlighted. In formatting this document for display, Application 200 has recognized this text string as corresponding to another document within the device library, and has embedded a hyperlink within the text string such that the other document will be loaded onto user device 130's display screen if the hyperlink is selected. How application 200 accomplishes this task will be discussed further below.

Figure 11:
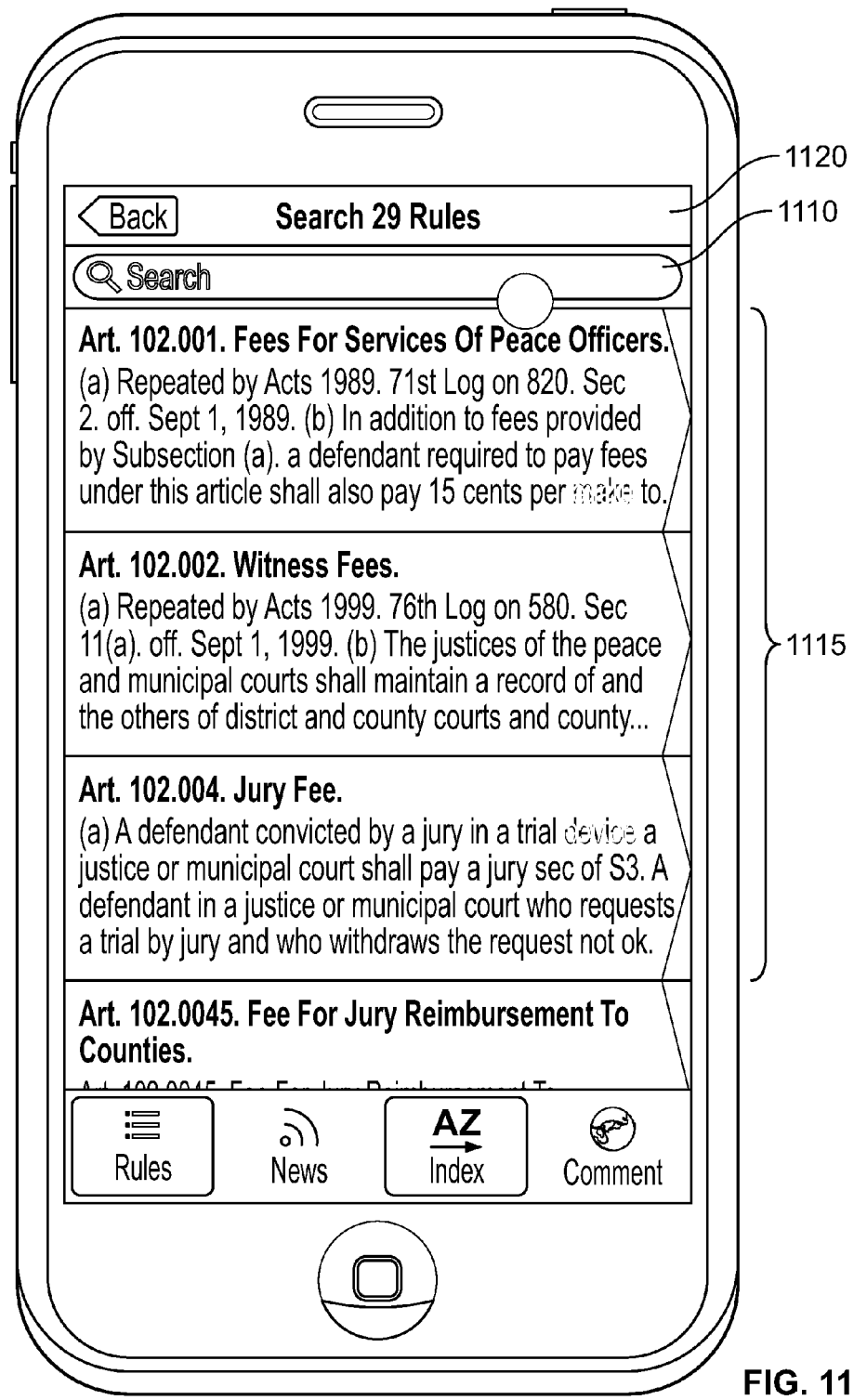
FIG. 11 is a screen shot of a user device operating the research system application that shows a first search screen, in accordance with a particular embodiment.

The user device 130 in FIG. 11 shows a list of the articles within title or part 102 of the designated reference set. In this case, there are twenty-nine different articles, e.g., Art. 102.001, 102.002, and so forth. Here, the user has elected to search within the articles for certain content. The search bar 1110 allows the user to search for content within the twenty-nine summarized search documents 1115 presently loaded on the user device screen. In the search view as shown, the number of summarized search documents 1115 at any level within the reference set will be depicted in the information bar 1120 at the top of the screen. In this manner, the document referencing system 100 allows for hierarchical searching. For example, if a reference set is comprised of 50 titles, each containing numerous articles, with each article containing numerous sections that make up the individual documents of the reference set, searching at the title level may result in thousands of hits. Many of these hits will likely be irrelevant, and can be discarded based on the title under which they are found. However, to simplify this process, the document referencing system application 200 allows a user to search only within the specific level they are at within the reference set at any given time. In the case of FIG. 11, perhaps the user is within Title 100 and Article 102. Thus, any search will only generate results within that subset, which in this case is comprised of 29 documents. This allows for very targeted searching within specific areas of a reference set.

Notably, the device and system libraries of document referencing system 100 store documents in a searchable format, such that text may be scanned and recognized by known means. When documents are received as images, the document referencing system application 200 scans the images and generates a text-based document to replace the image using standard optical character recognition software techniques. Storage of documents in this manner allows them to be easily searched by application 200. Though searching within reference sets stored in the device library of a user device 130 is discussed, it will be understood that a user could search reference sets in the same manner within the system library through connection to document referencing server 110.

Figure 12:
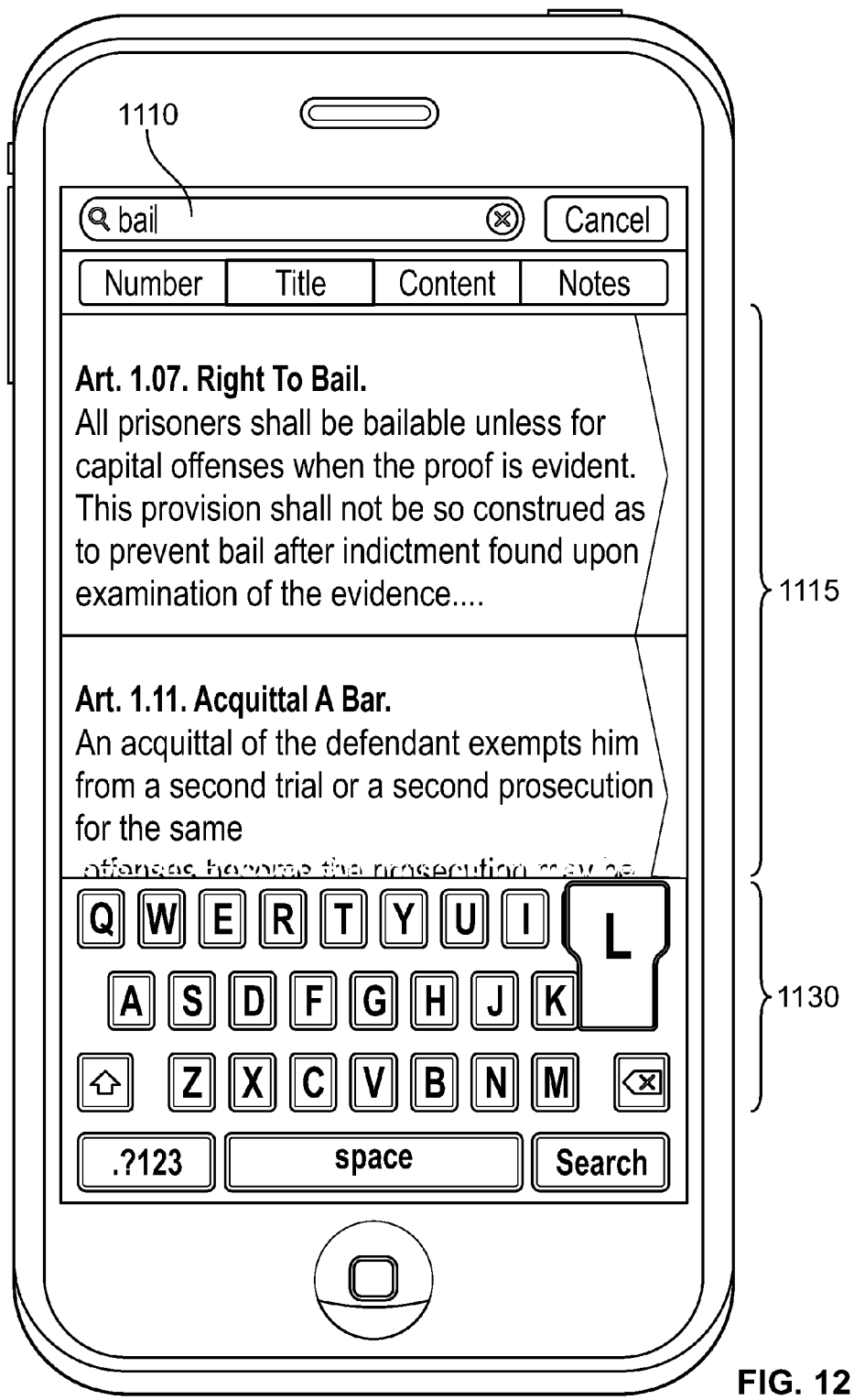
FIG. 12 is a screen shot of a user device operating the research system application that shows a search input screen, in accordance with a particular embodiment.
Figure 13:
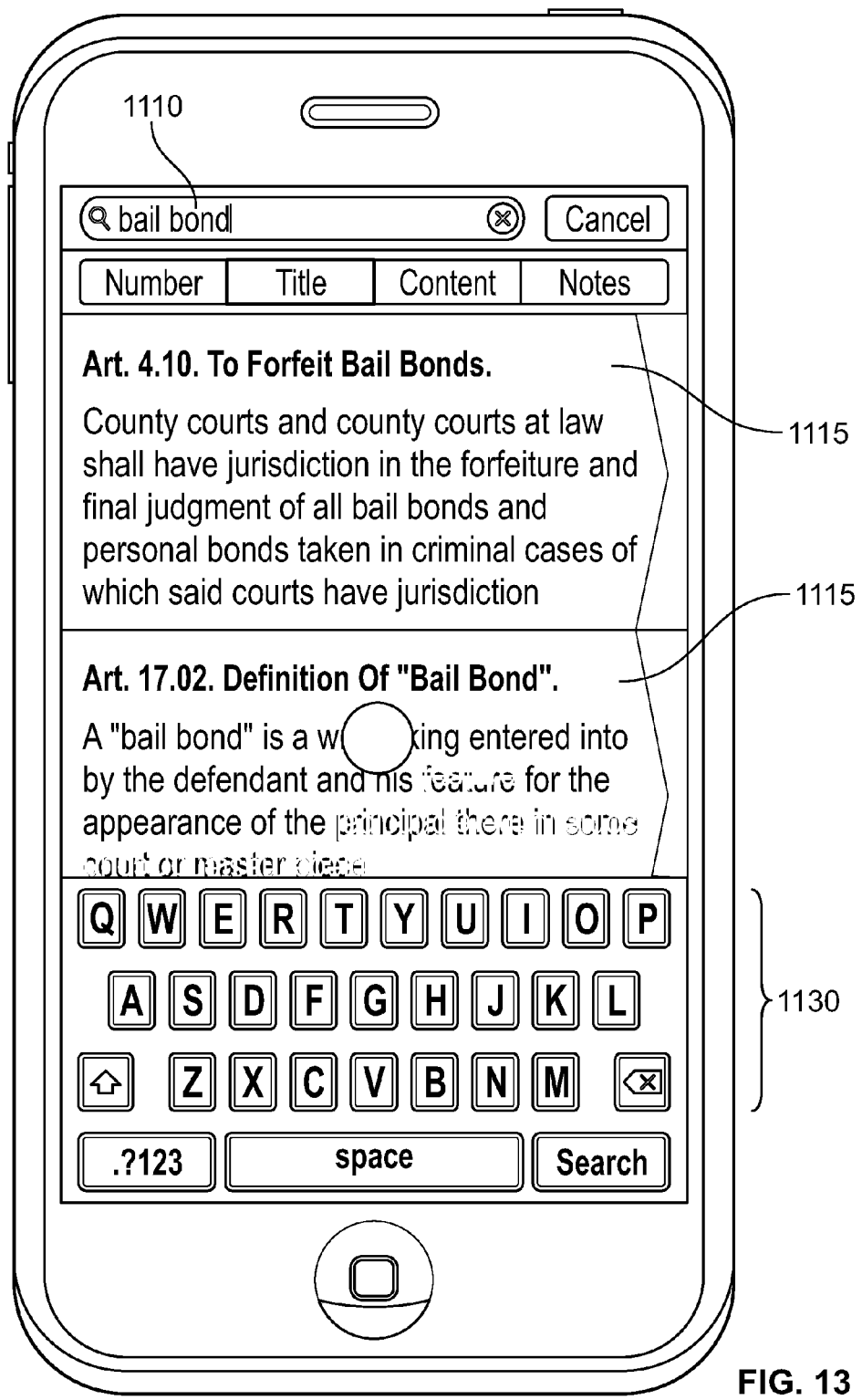
FIG. 13 is a screen shot of a user device operating the research system application that shows a search input screen as additional data is entered, in accordance with a particular embodiment.

In FIG. 12, the user device 130 has presented a keyboard 1130 for the user to enter data into the search bar 1110. As the user enters search criteria into the search bar 1110, the document referencing system application 200 will begin to eliminate certain documents within the reference set, and the number of summarized search documents 1115 listed on the user device screen will begin to reduce. This is indicated by comparing FIGS. 12 and 13. In FIG. 12, the first summarized search document 1115 is Article 1.07, which contains the search string "be". However, as the user continues typing the term "bail bond", the field is reduced in FIG. 13 such that Article 4.10 is the first summarized search document. If the user types a search string that is not found within any documents at the hierarchical level where the user is within the reference set, the application 200 will show no summarized search documents.

Figure 14:
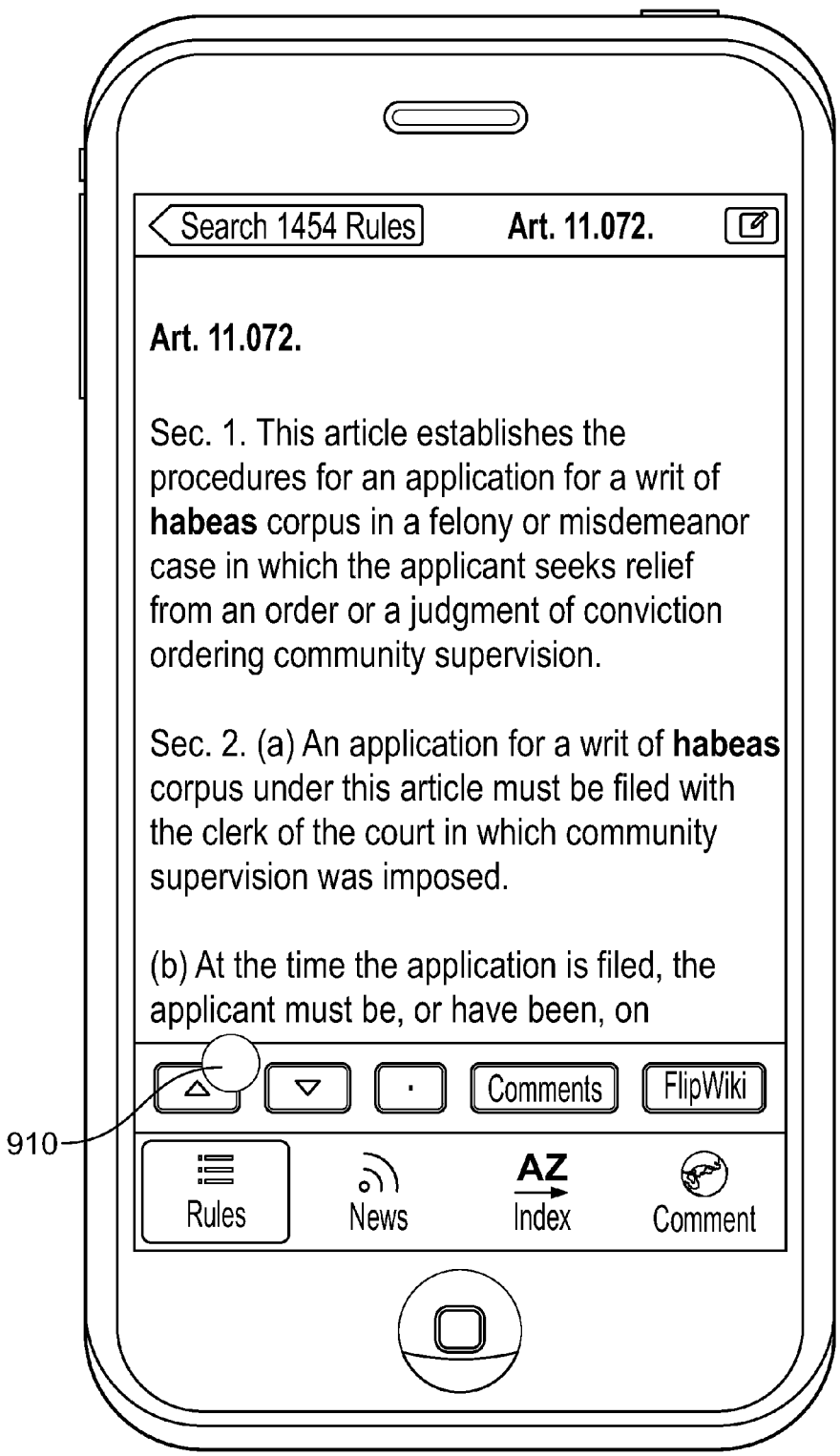
FIG. 14 is a screen shot of a user device operating the research system application that shows a first search results screen, in accordance with a particular embodiment.

When one of the summarized search documents 1115 is selected from the search results, the document referencing system application 200 presents the entire document, such as in FIG. 14. Notice that the search string ("habeas" in this case) is highlighted in the presented document, showing where it was identified by application 200. Once again, up and down arrow buttons 910 appear. However, in search mode, selecting these buttons will cause application 200 to scroll up or down among the documents resulting from the search. Thus, pressing the up arrow button 910 will not load Article 11.071, but rather the previous document within the reference set that contained the search string "habeas", assuming there was such a document.

Figure 15:
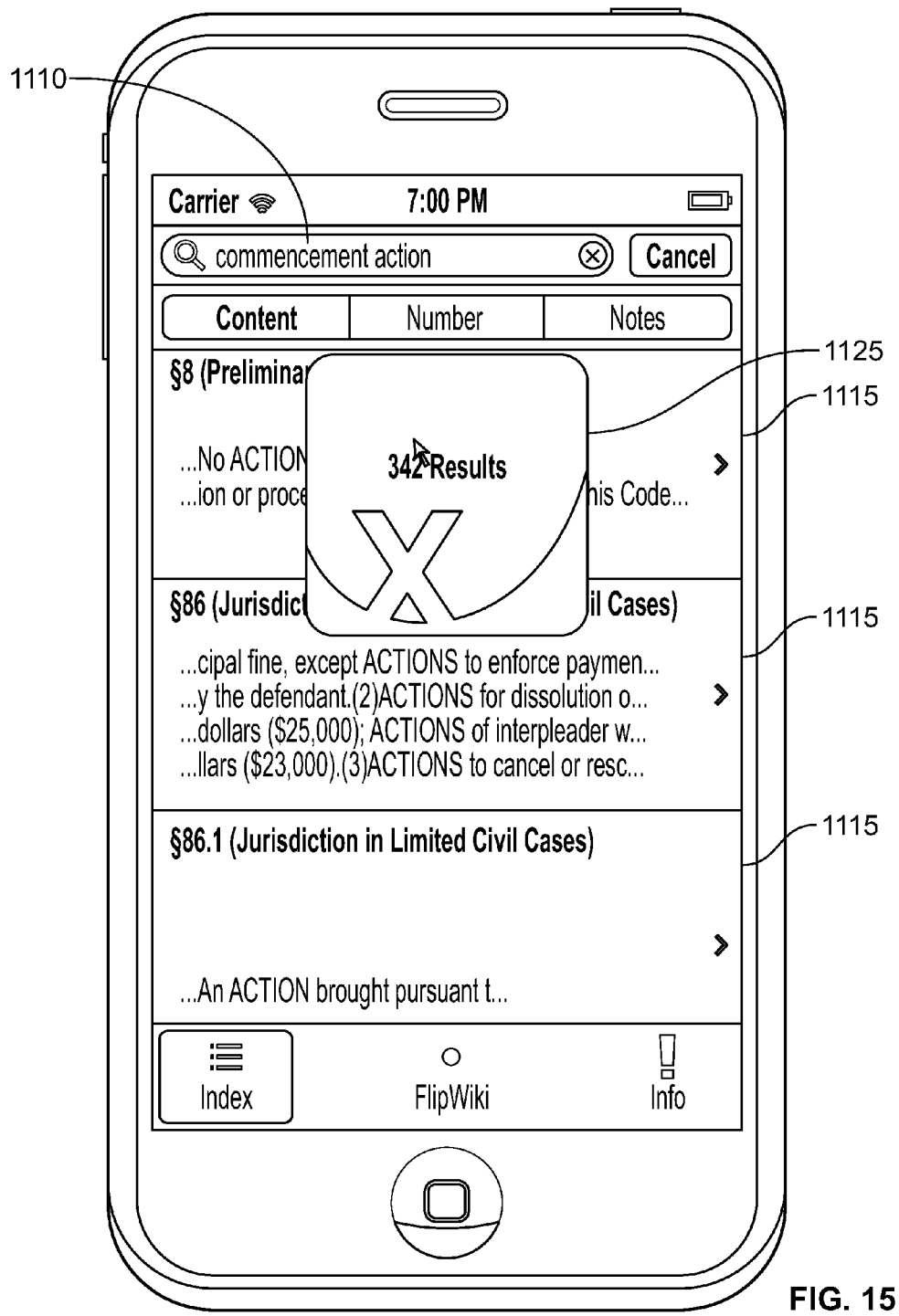
FIG. 15 is a screen shot of a user device operating the research system application that shows a second search results screen, in accordance with a particular embodiment.

FIG. 15 shows a search results screen in a slightly different embodiment. Here, the information bar 1120 has been replaced by a floating window 1125. In this case, the document referencing system application 200 is indicating that there are 342 documents at the current level within the selected reference set that contain the words "commencement" or "action." Document referencing system 100 utilizes standard Boolean search commands. Thus, a search for [commencement action] will cause application 200 to locate documents having either term, while a search for ["commencement" "action"] will cause application 200 to locate documents having both terms. As shown in FIG. 15, this has reduced the number of documents located from 342 to 16.

Figure 16:
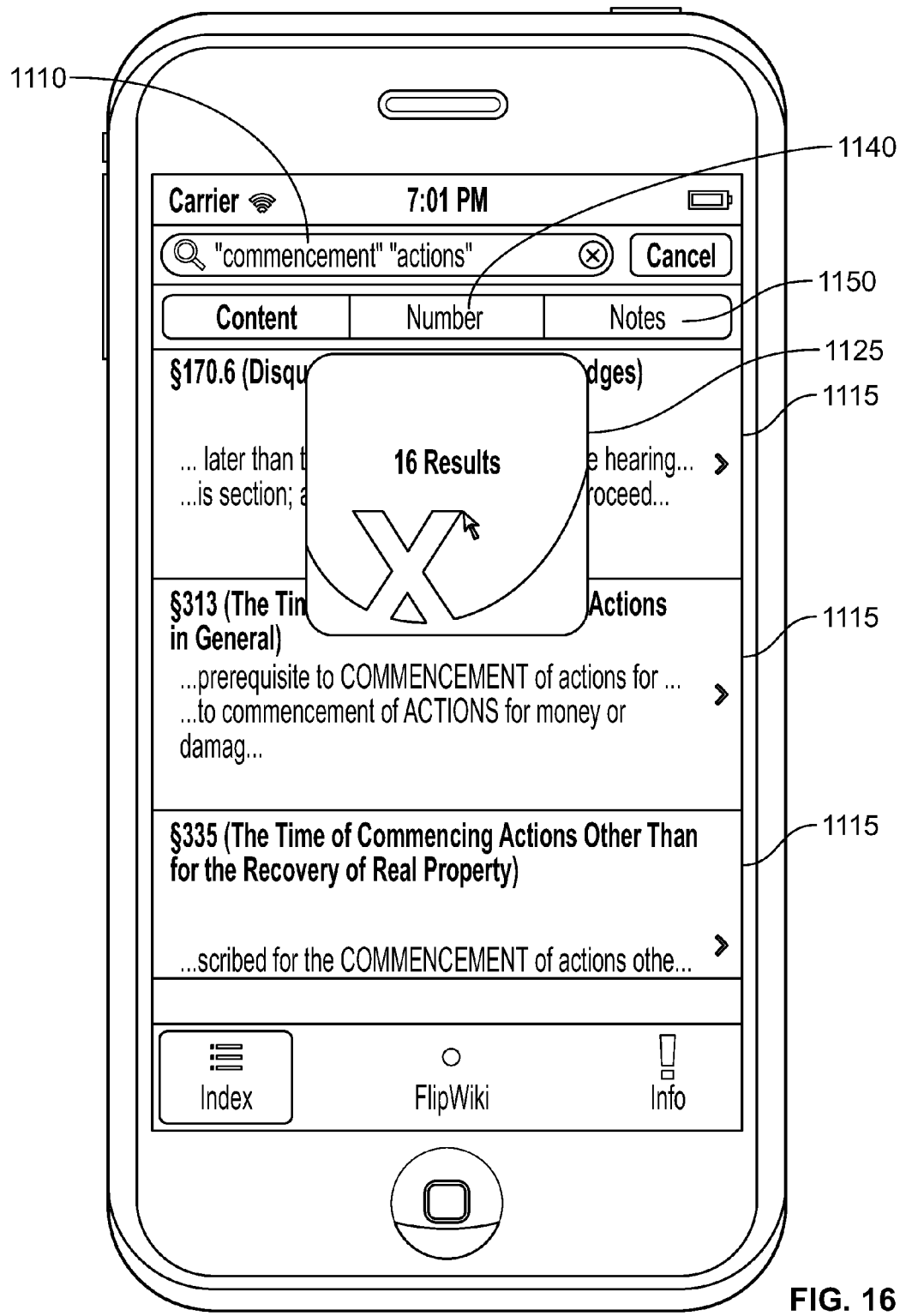
FIG. 16 is a screen shot of a user device operating the research system application that shows a third search results screen, in accordance with a particular embodiment.

As shown in FIG. 16, searching may be performed by content, number or notes. Searching by content is the default method, and searches by standard text string searching as described above. Selecting the number search tab 1140 will cause the document referencing system application 200 to only look within the title of the document, or specifically within the citation associated with the document. For example, if a user knows the citation of the article and section they are looking for within a reference set, they can simply enter the corresponding numbers into the search bar 1110 when the number search tab 1140 is selected, and the proper reference will come up. Though referred to as the number search tab, selecting this tab causes the document referencing system application 200 to focus on citations rather than document text. Thus, the application will identify either letters or numbers that are used in citations. For example, a court opinion might be designated "400 F.2d 1000." If this string is entered into the search bar 1110 when the number search tab 1140 is selected, the application 200 will present the corresponding case document from the device or system library.

Document referencing system 100 also allows a user to enter notes or comments that are associated with a given document being viewed on user device 130. For instance, if a document is located through a search that the user believes is important to prove a point connected with bail bonds, the user might enter a note such as "This is the bail bonds document Joe Johnson was looking for." The document referencing system application 200 will then store the user's note in the device library in a location associated with that specific document. When the document is selected, the note will again appear on the user's device, at which time the user may delete the note if they choose. However, note creation also allows a user to quickly locate a document by searching via the notes search tab 1150. When the notes search tab 1150 is selected, the application 200 only searches notes that have been associated with documents in the applicable reference set. In the example above, assuming the user has not used Joe Johnson's name in a variety of notes, the user can quickly locate the correct bail bond document by simply searching for "Joe Johnson" while the notes search tab 1150 is selected. The application 200 will identify the proper note, and will load the corresponding document.

Notes may also be entered and associated with documents being viewed in the system library. In this case, the document referencing system application 200 still preferably stores the notes in the user's device library on user device 130, but stores them with a reference to the proper document in the system library. Depending on the document referencing system configurations established by the user upon setup, user device 130 may temporarily cache certain documents viewed from the system library within the user's device library even though the user does not subscribe to the reference set which contains the document. This allows the user to continue to review the selected document without connection to the Internet, and without acquiring other content from the reference set that is not desired. In the exemplary context of the legal field, this might be practical if a user is involved in a particular case involving widget design. The user may want to have repeated access to other cases involving widgets, or perhaps to technical manuals on widget architecture, but without obtaining a subscription to all documents in the reference set where such documents might be found. Instead, the user can locate the widget documents on the system library using application 200, and then pull them into the device library on user device 130 where they will remain for further use for a pre-determined period of time. The cache of such documents may be maintained according to any known means such as first in-first out with a cache size limiter, organization by frequency of use or time viewed, etc.

Figure 17:
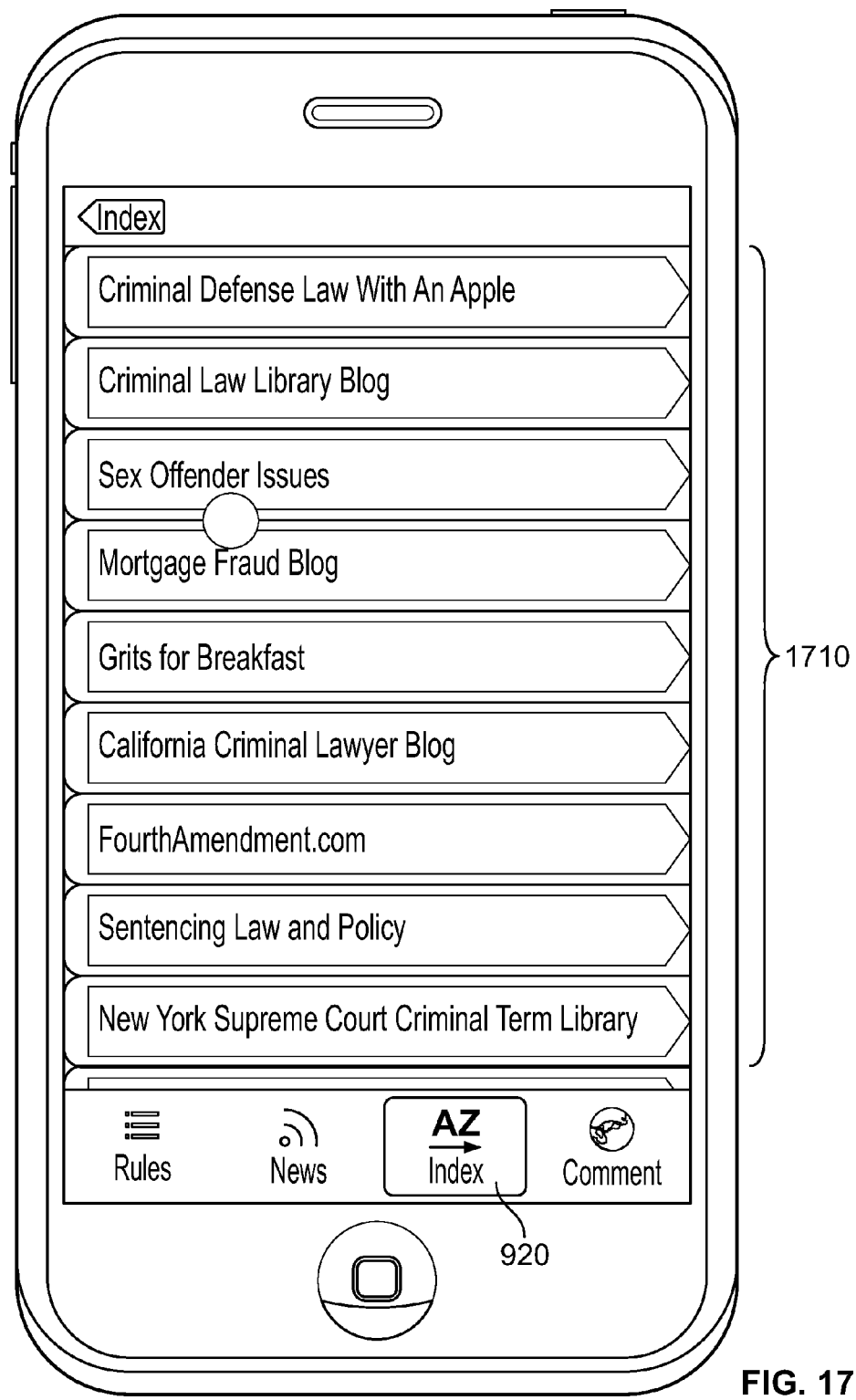
FIG. 17 is a screen shot of a user device operating the research system application that shows certain index topics available through the system library, in accordance with a particular embodiment.

To this point, it has been demonstrated how the document referencing system application 200 can be used to view and search for documents within given reference sets. However, the application 200 can also perform more broad searches for content, such as for news or updates related to certain topics, or located on certain Internet sources. FIG. 17 shows a screen view of the application 200 running on a user device 130 when the index control 920 is selected. This control may be labeled with other names in other embodiments. Selecting the index control 920 connects user device 130 with the document referencing server 110, and the application 200 presents a list of the available index topics 1710 that the user may choose from. In some embodiments, the user may personalize this screen so that application 200 only lists those index topics that are associated with the user's account. The index topics 1710 may simply be blogs or websites known to focus on certain content areas or address certain issues. Each index topic 1710 may also have subtopics 1712 that can be referenced. For example, the U.S. Supreme Court Blog might be an index topic 1710 within which there may be documents relating to subtopics 1712 such as constitutional law or criminal law.

Figure 18:
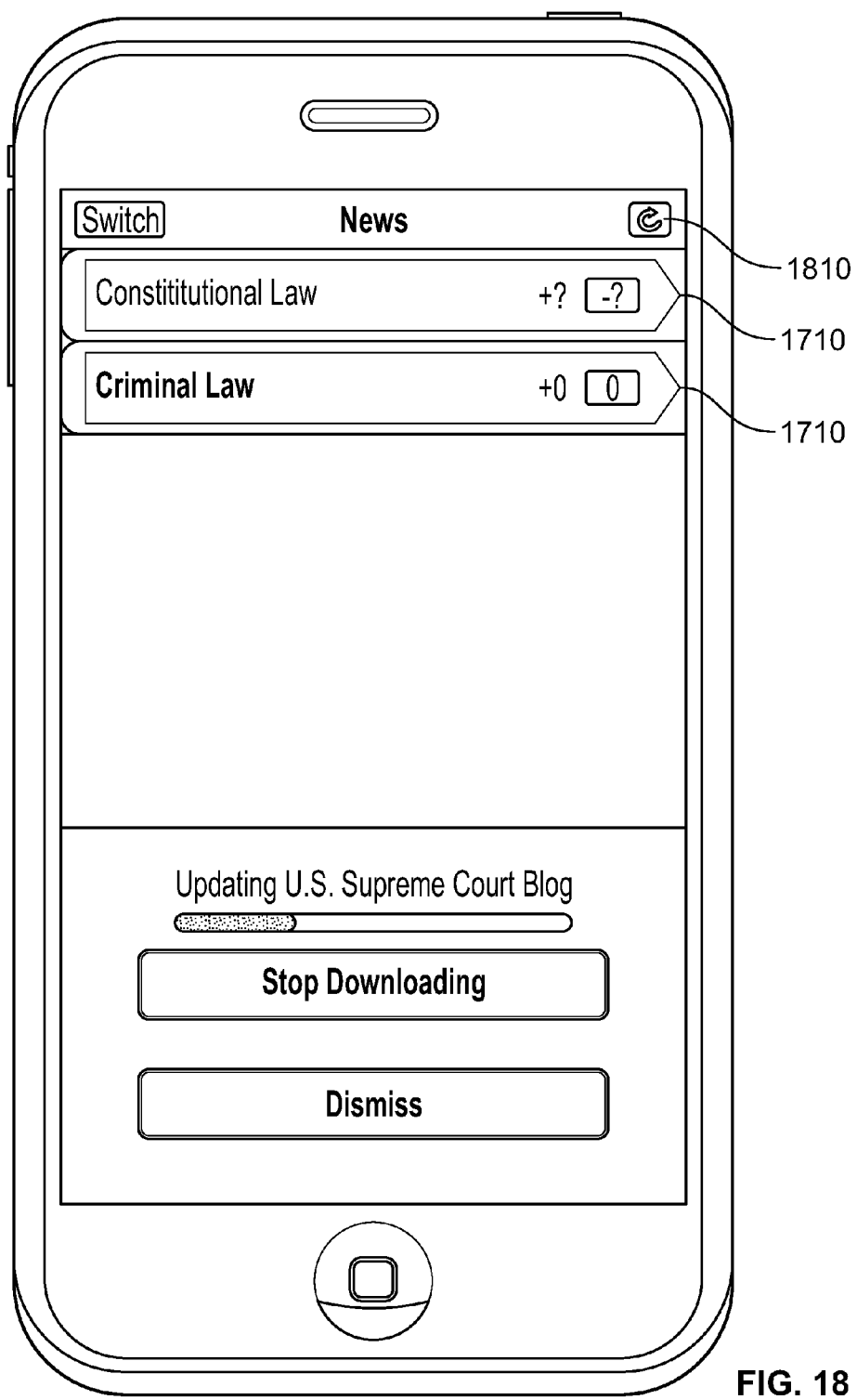
FIG. 18 is a screen shot of a user device operating the research system application that shows a news download screen, in accordance with a particular embodiment.

As shown in FIG. 18, a user has selected the U.S. Supreme Court Blog from the list of index topics 1710, and has requested documents from that index topic relating to the subtopics of constitutional law and criminal law. The documents within a given index topic 1710 may be pre-associated with subtopics 1712, or the document referencing system application 200 may perform this association by scanning the available documents for certain content it has been programmed to associate with the subtopics. In FIG. 18, each subtopic 1712 is listed along with a highlighted number, which reflects the number of documents that the user has downloaded relating to that subtopic. For example, this user has previously gathered news related to the subtopic of constitution law, and application 200 located and downloaded seven different documents to the user's device library on user device 130. The document referencing system application 200 may have located these documents on the system library database 112, or from other servers 140 or 150 on the Internet. Preferably, application 200 only identifies and downloads very recently published content from the index topic source, such as those documents. made available since the last time the user searched the index topic 1710 for news, or a few months, whichever is less.

Figure 19:
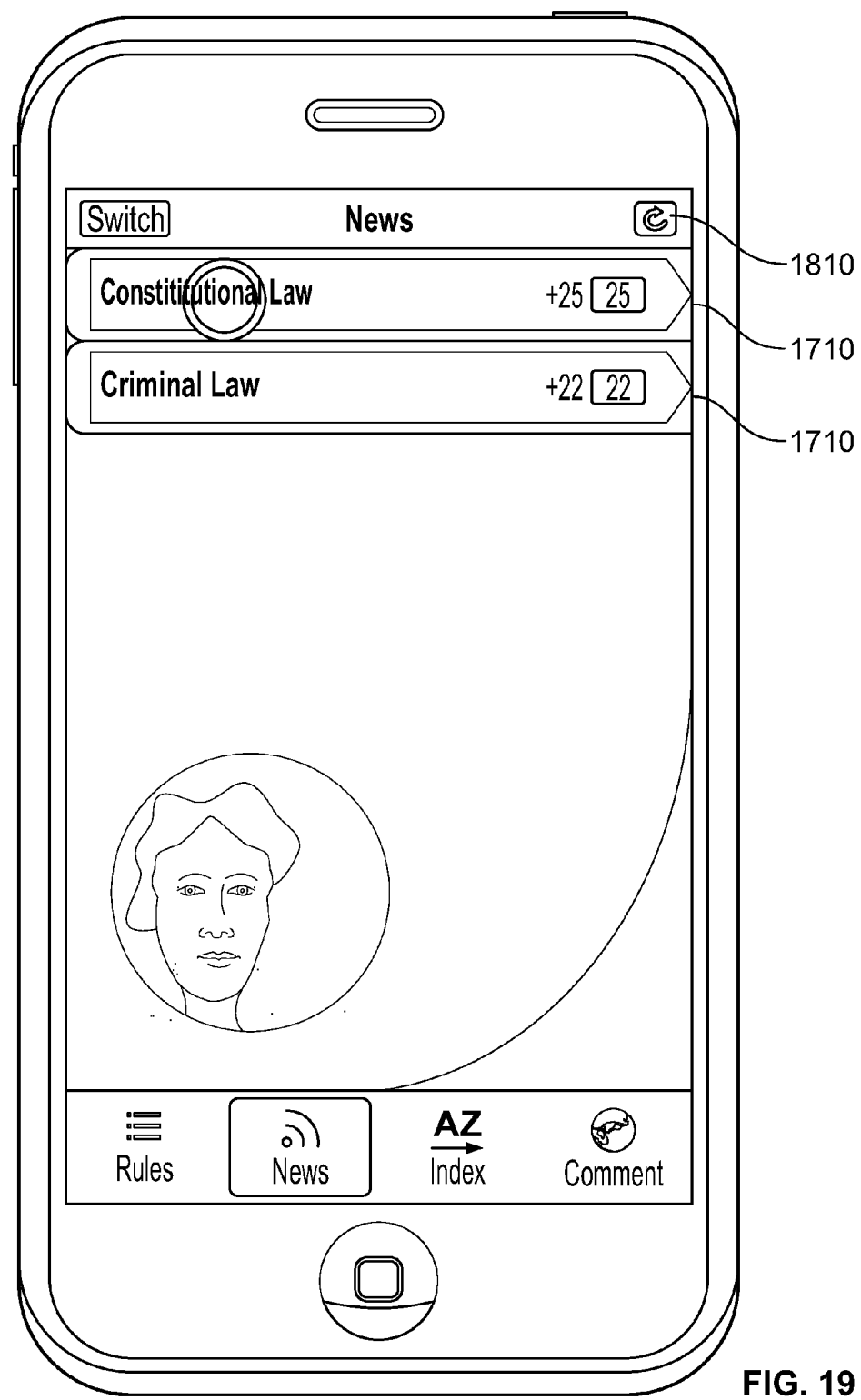
FIG. 19 is a screen shot of a user device operating the research system application that lists the number of downloaded news documents within certain subtopics, in accordance with a particular embodiment.

In FIG. 18, the user has selected the refresh button 1810, which has caused application 200 to search the U.S. Supreme Court Blog index topic for documents fitting within the selected subtopics of constitutional and criminal law. The application 200 makes it easy for the user to stop the download in cases where the content is taking up too much space on the user device 130. FIG. 19 shows the same screen as FIG. 18 once the document referencing system application 200 has completed downloading the updated news documents. Note that there are now twenty-five documents under the constitutional law subtopic 1712, and twenty-two documents under the criminal law subtopic 1712.

Figure 20:
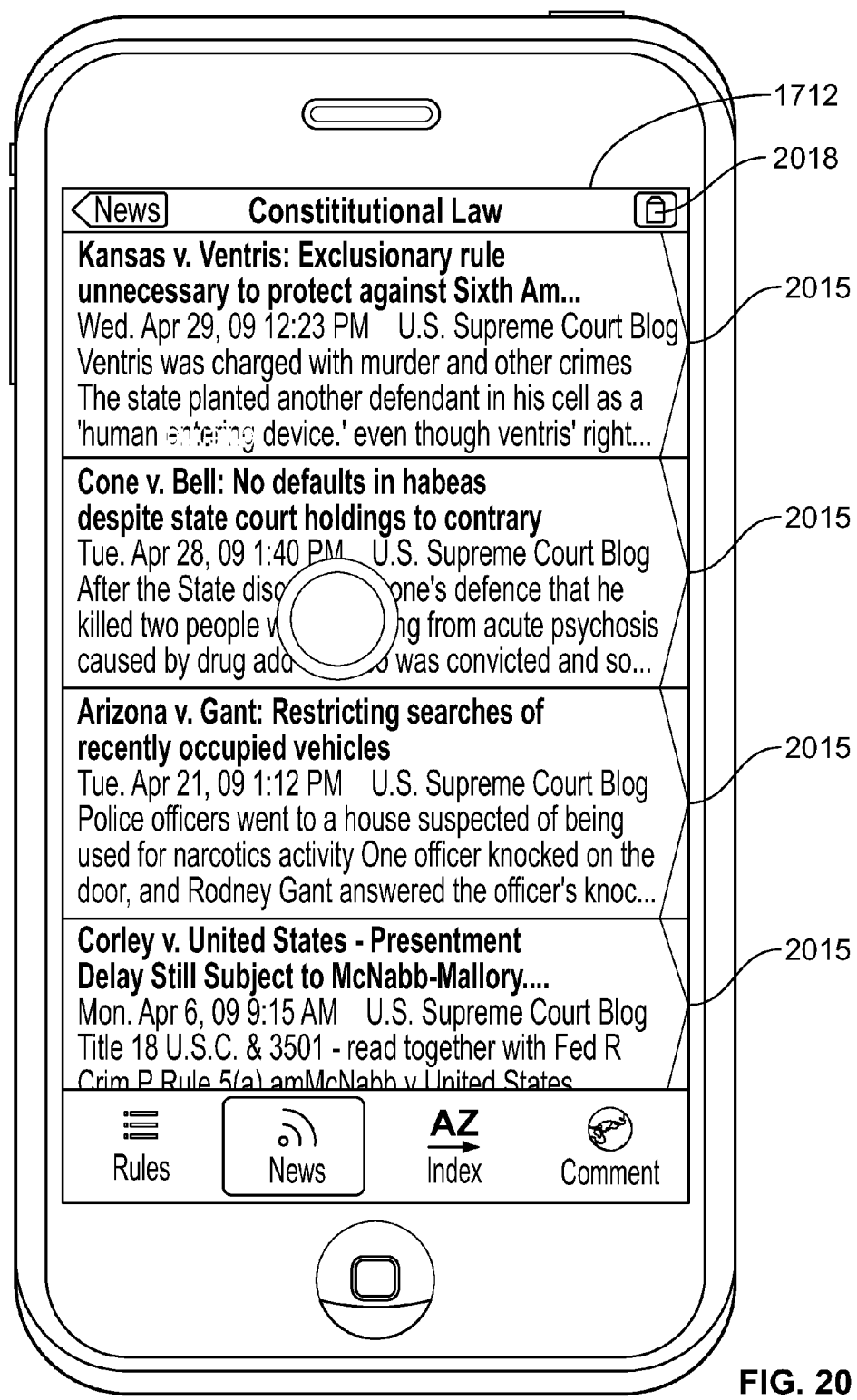
FIG. 20 is a screen shot of a user device operating the research system application that shows summarized news documents, in accordance with a particular embodiment.

In FIG. 20, the user has elected to review the documents collected by application 200 corresponding to the constitutional law subtopic. Note that the name of the subtopic 1712 appears at the top of the screen. Similar to the search screens that show summarized search documents 1115, such as that shown in FIG. 11, the application 200 presents summarized news documents 2015. These summarized news documents 2015 may be blog articles or other media that the application 200 has downloaded. In some embodiments, application 200 only downloads and formats the summaries to conserve space, and does not download the entire document associated with the summary unless the user subsequently elects to do so. A trash icon 2018 at the upper right corner allows a user to discard summarized news documents 2015 that application 200 has collected, but that do not appeal to the user. Highlighting summarized news documents and selecting the trash icon 2018 will delete the summarized news documents from the user device 130. Moreover, this will prevent application 200 from acquiring the same documents during the next news gathering session, because the application 200 will only look for news published since the last gathering.

Figure 21:
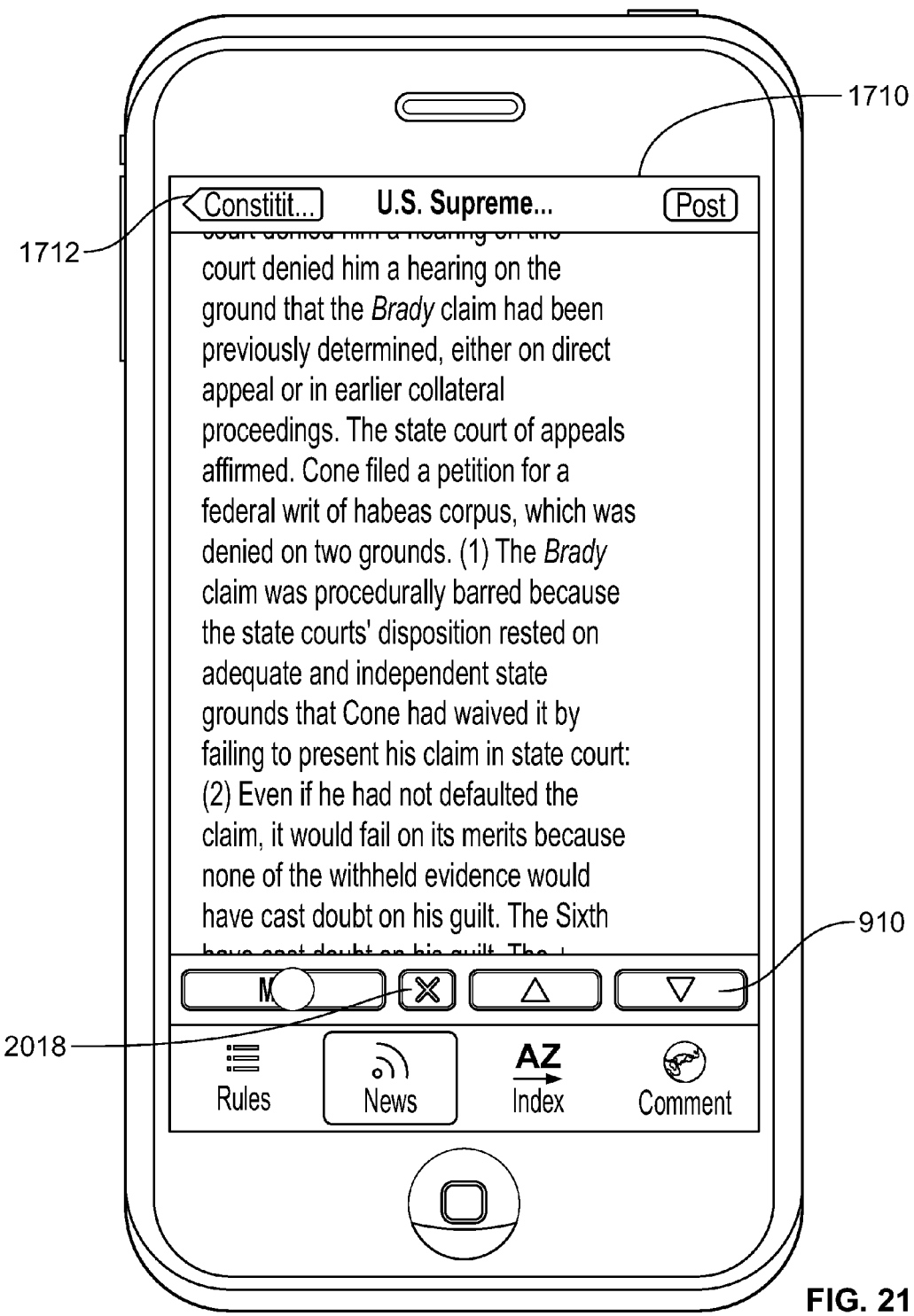
FIG. 21 is a screen shot of a user device operating the research system application that shows a specific news document, in accordance with a particular embodiment.
Figure 22:
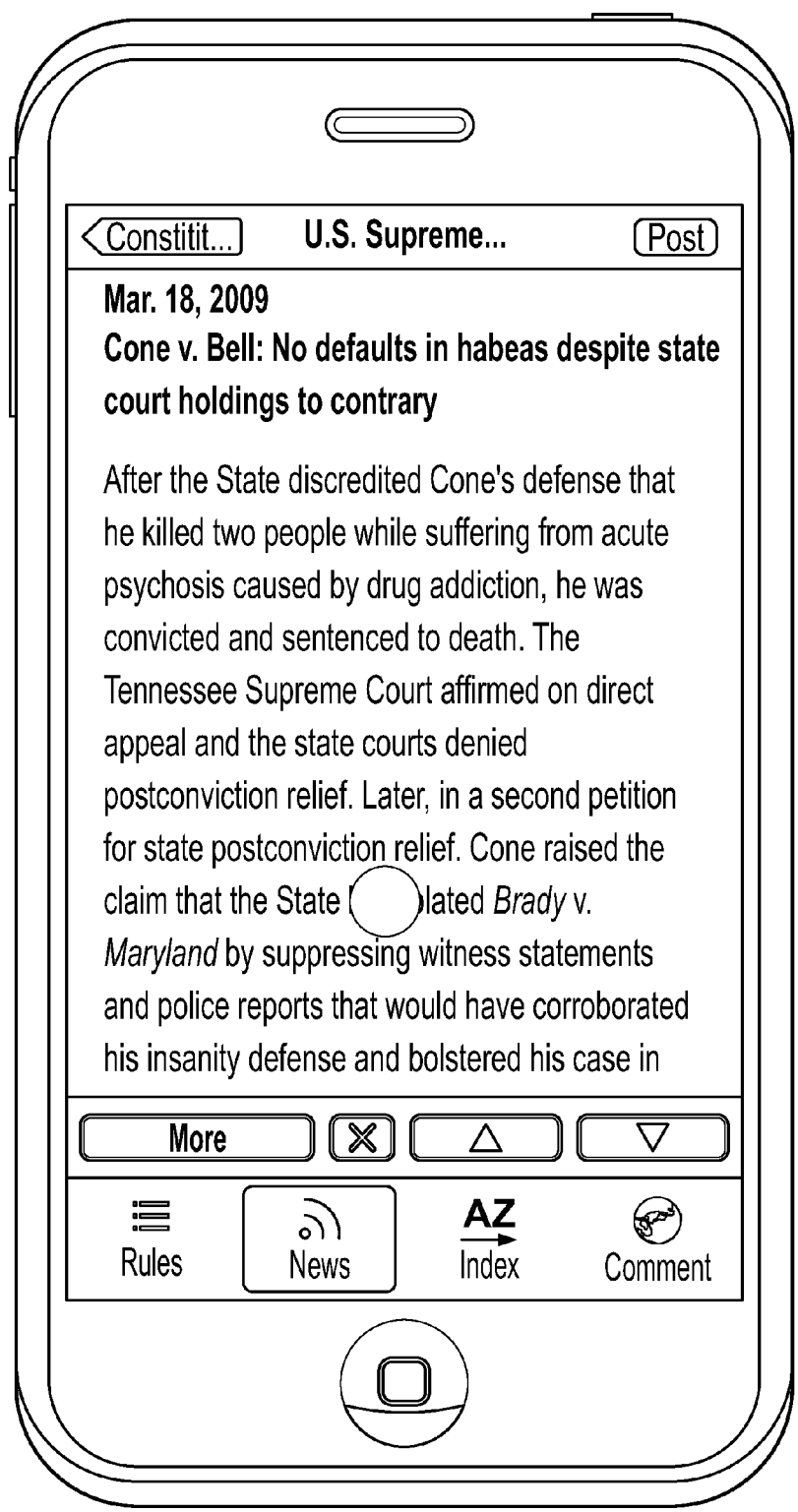
FIG. 22 is a screen shot of a user device operating the research system application that shows a specific news document in its native form, in accordance with a particular embodiment.

In the example of FIG. 20, the user elects to acquire the full article associated with the summarized news document 2015 titled "Cone v. Bell: No defaults in habeas despite state court holdings to contrary." The application 200 acquires and downloads the full article and presents it as shown in FIG. 21. The document is presented by application 200 in a formatted fashion that allows for easy reading depending on the user device 130. At the top of the screen, both the index topic 1710 and the subtopic 1712 are listed, to remind the user of the source of the document and its subject matter. Once again, up and down arrow buttons 910 are present, allowing the user to scroll to the prior or next full document from among the list shown in FIG. 20. The user may choose to delete the document by selecting the trash icon 2018, or may share the document with others by selecting the post command 2105. In some embodiments, the application 200 may provide a link for the user to view the selected document in its native environment, such as on the webpage connected with the U.S. Supreme Court Blog. This feature is demonstrated in FIG. 22. Note that the native Internet window is still presented within the document referencing system interface.

Figure 23:
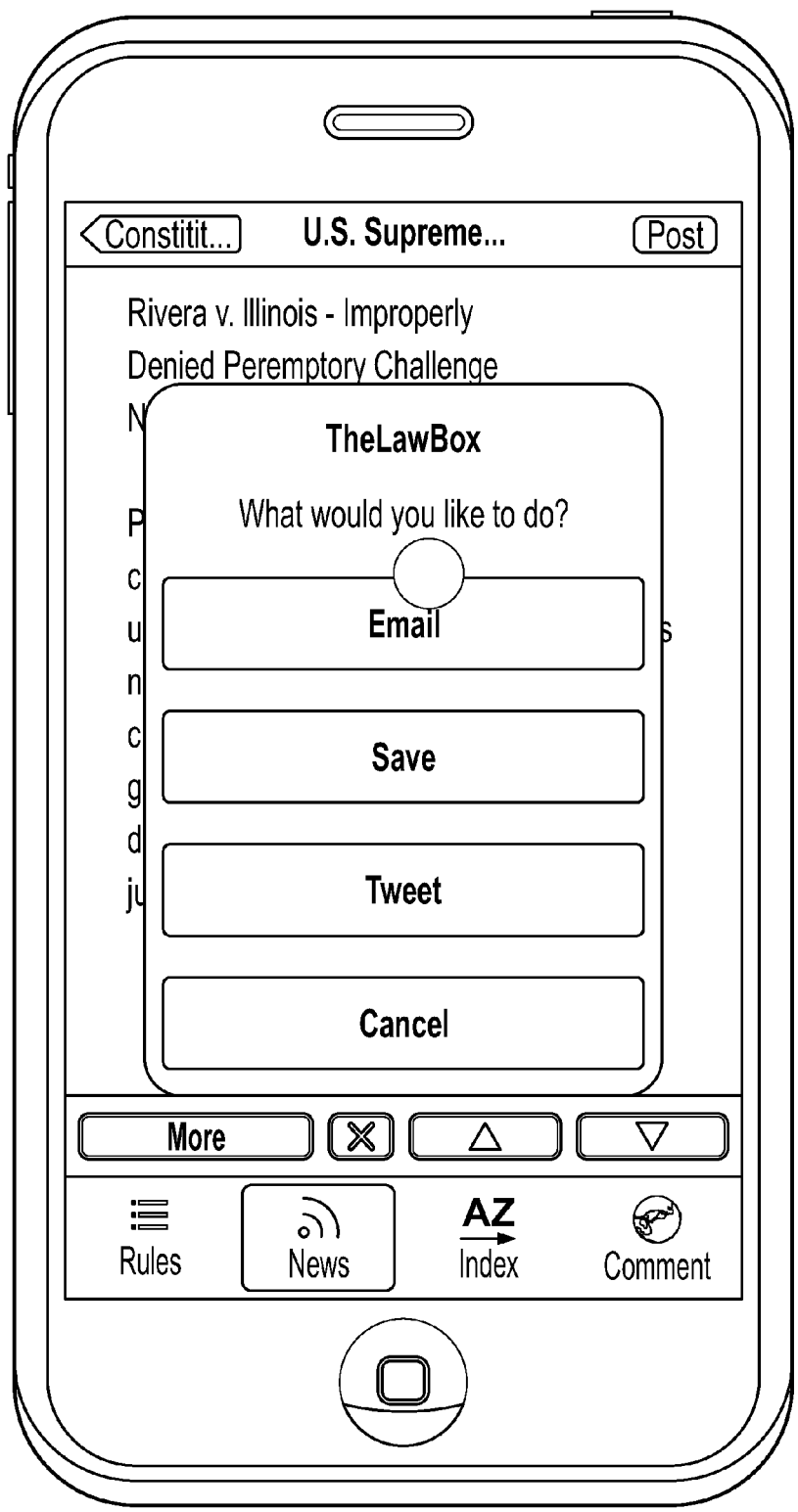
FIG. 23 is a screen shot of a user device operating the research system application that demonstrates the ability to share content, in accordance with a particular embodiment.

In FIG. 23, the user has selected the post command 2105, and the document referencing system application 200 has generated a new window providing options to the user. As indicated, the application 200 can be fully integrated with the other functionality of user device 130, and of various social networks to which the user may subscribe. By providing the user's various account information upon system registration, application 200 will be able to interface with the user's email server, and with various social networks such as Facebook, LinkedIn, or Twitter. This allows the user to quickly share content or documents located through document referencing system 100 with others. This utility also allows for users interconnected through an intranet, or members of a group such as a company or law firm, to share information only among those so with access to the intranet knowledge base. In some embodiment, the group, such as a law firm, may house an intermediate library, which consolidates the contents of all of the device libraries on all of the user devices. In this manner, the users from within the group can access and share material on the intermediate library with other group members without connection to the document referencing server 110 or the Internet at large. The intermediate library would typically be stored on a server associated with the group, such as the group's email server. Connection to that server could be made through landline using desktop user devices or other known means even if the network connection is down or unavailable.

Figure 24:
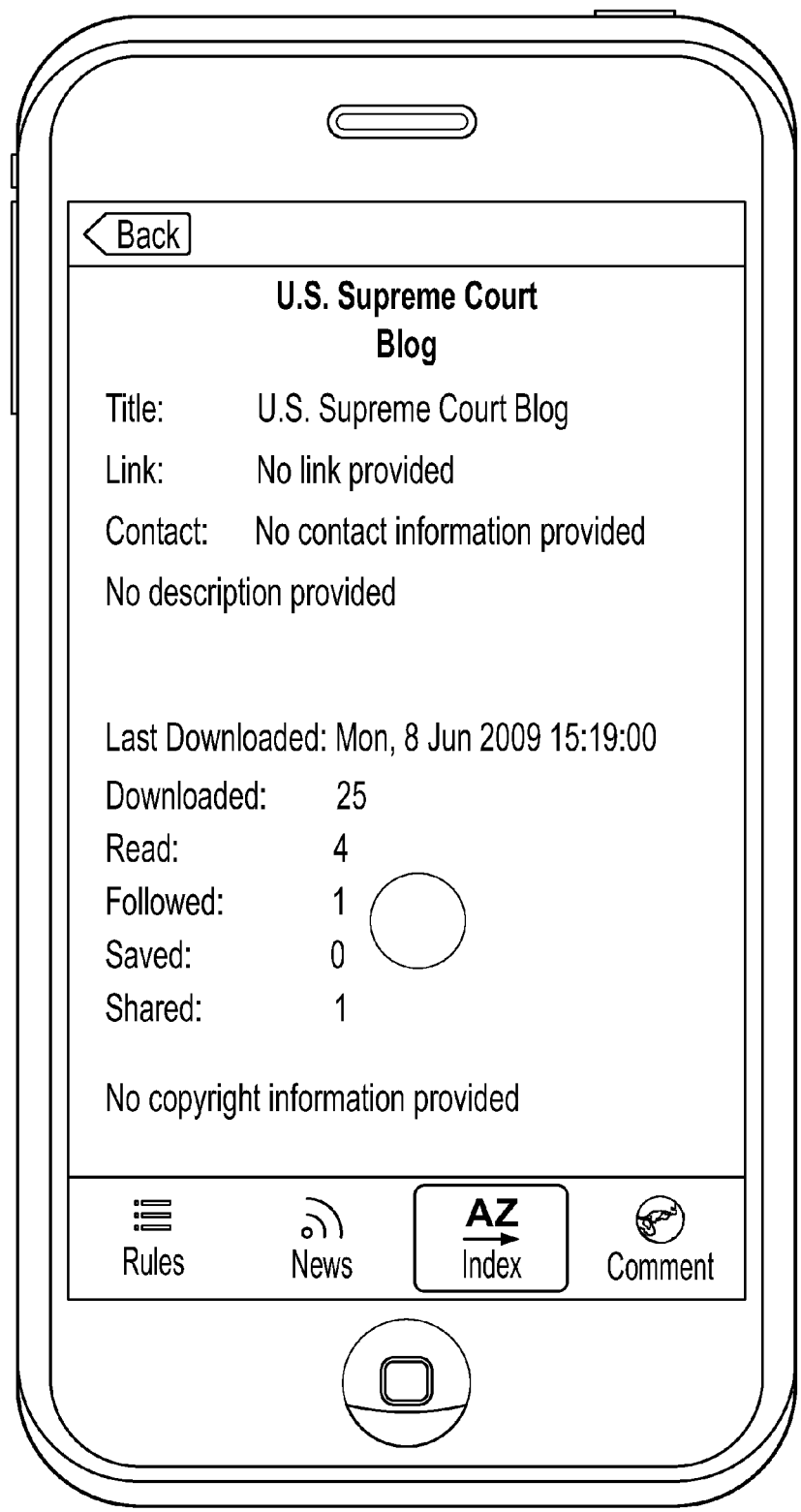
FIG. 24 is a screen shot of a user device operating the research system application that shows a summary of account activity, in accordance with a particular embodiment.

Finally, FIG. 24 shows a screen where the user has queried the account activity with a given index topic 1710, in this case the U.S. Supreme Court Blog. The document referencing system application 200 tracks the user's activity on each index topic, and stores this data with the user's account information. Thus, the Index and news searching feature of the document referencing system 100 allows a user to investigate a research topic or topic of interest beyond the bounds of references cited in a document, and beyond the device and system libraries. However, by using existing Internet search tools and the system's character recognition and association capability, a user can find additional resources without browsing the index or searching through a specific index topic 1710. Rather, the system's Flip Wiki™ feature takes the user directly from a document being read to related documents or media on the Internet with a single command.

Figure 25:
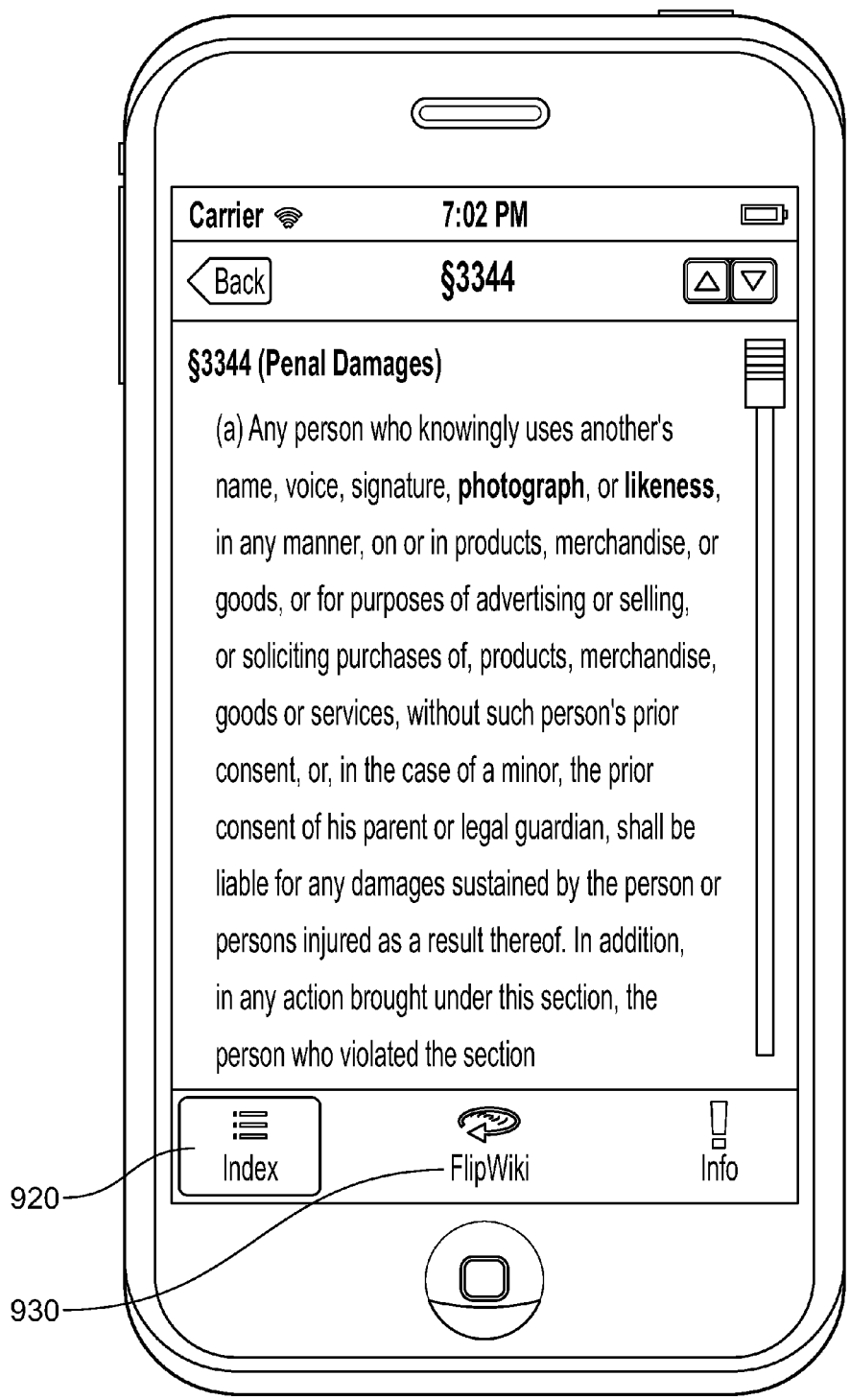
FIGS. 25-27 are screen shots of a user device operating the research system application that show operation of the Flip Wiki™ feature, in accordance with certain embodiments.
Figure 26:
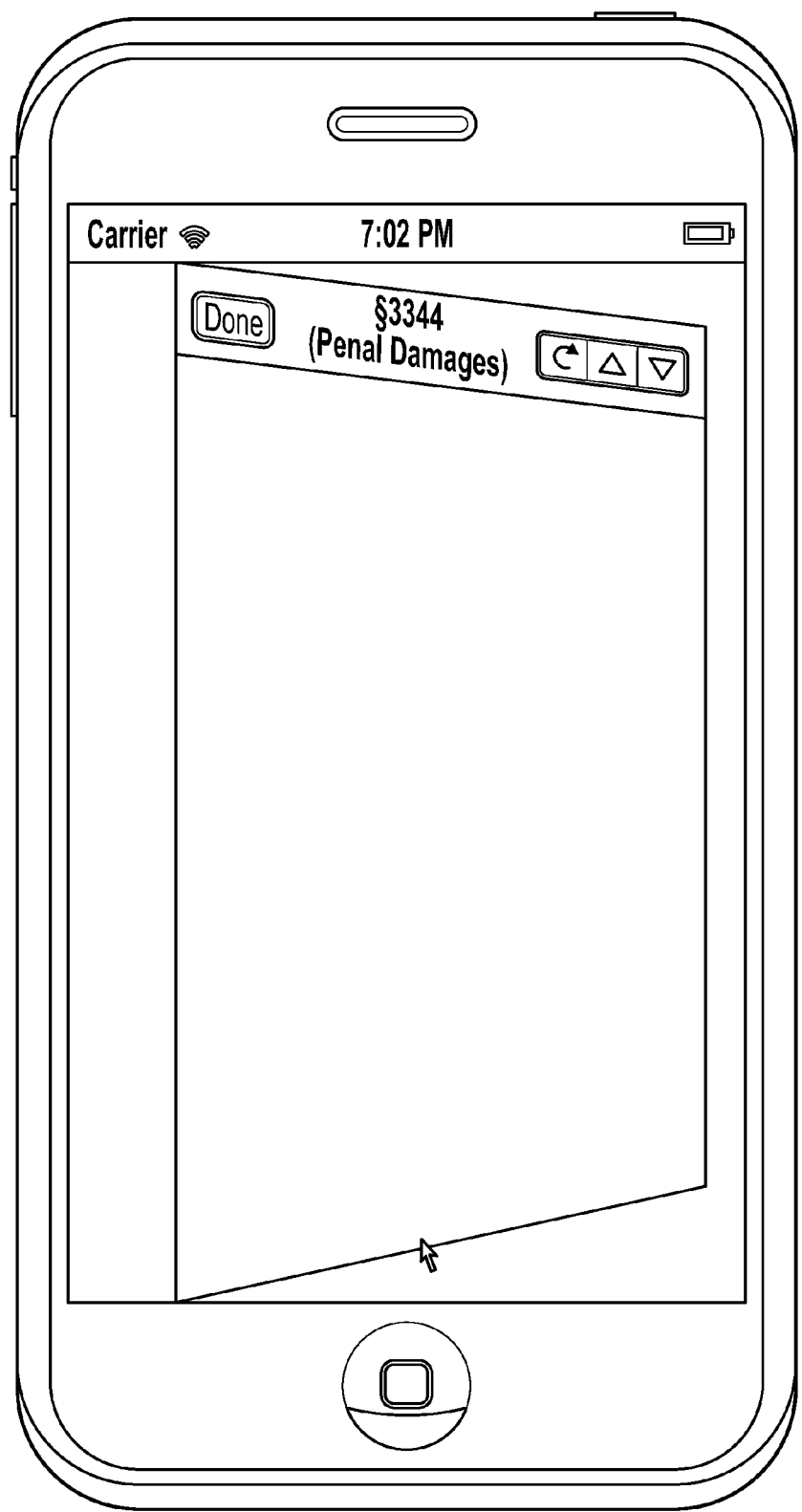
Figure 27:
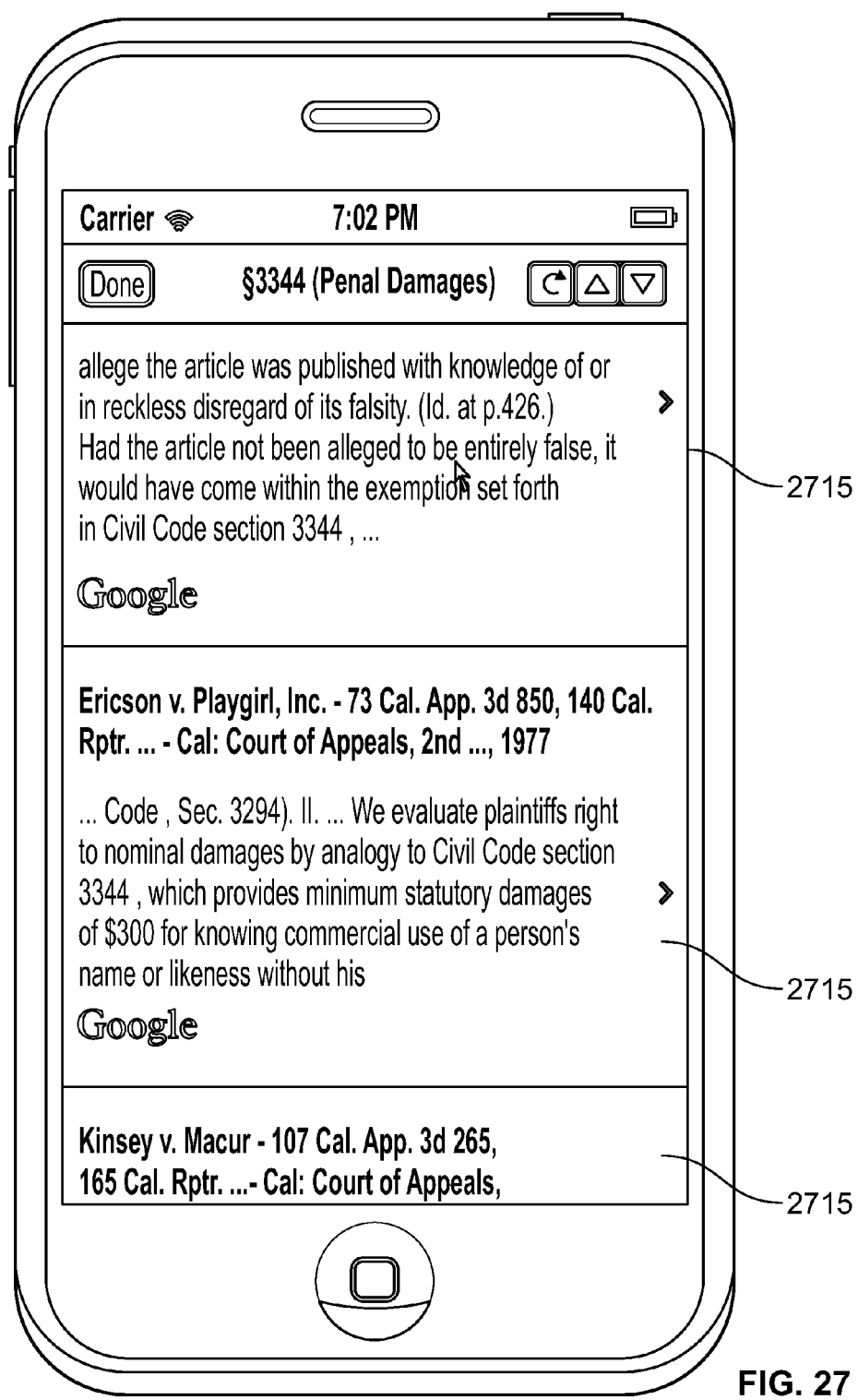
Figure 28:
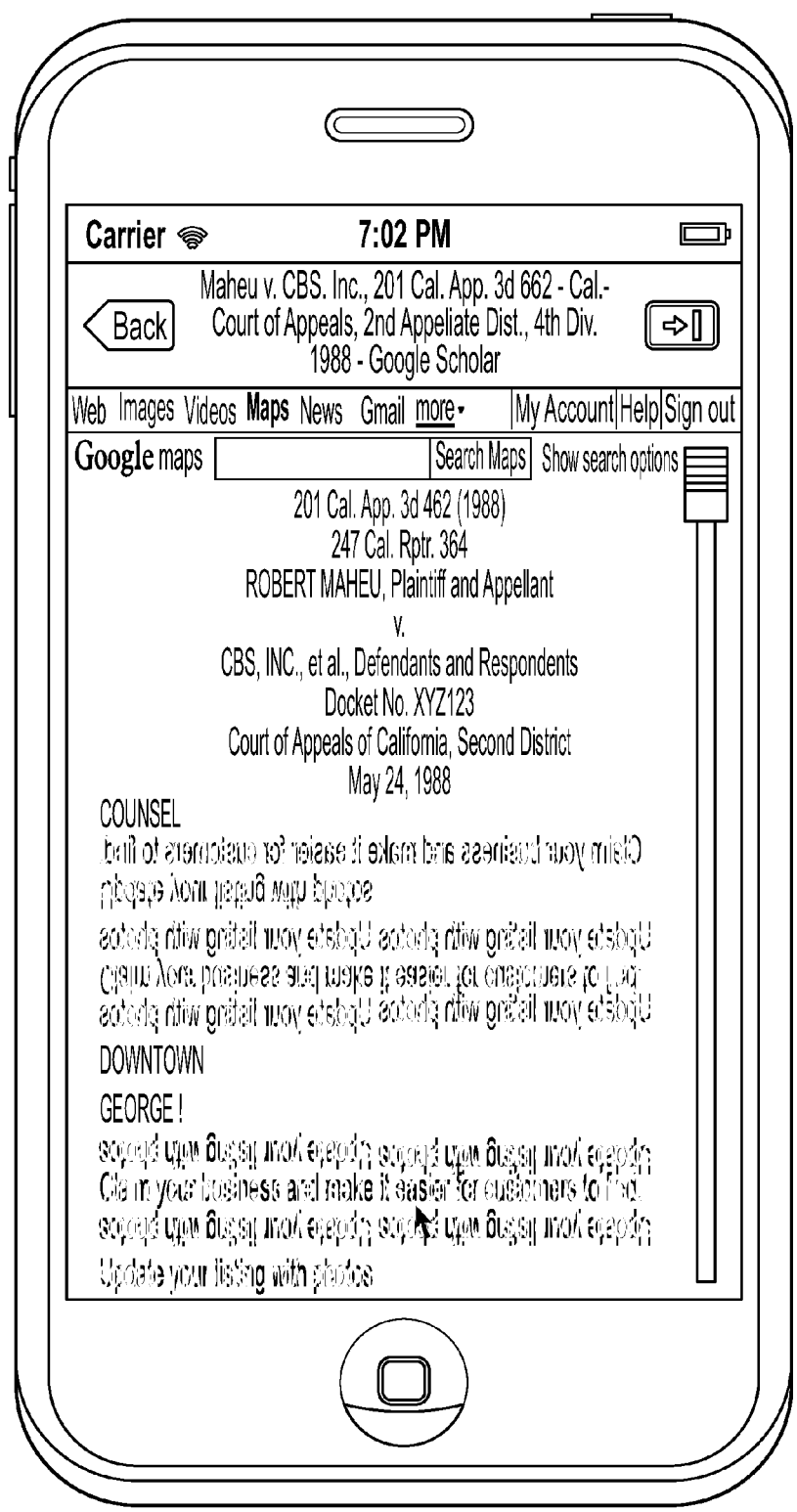
FIG. 28 is a screen shot of a user device operating the research system application that shows a native format reference obtained through the Flip Wiki™ feature, in accordance with a particular embodiment.

FIG. 25 shows the document referencing system interface presenting a particular statute, or document, on a user device 130. Note that the terms "photograph" and "likeness" are highlighted, indicating that this document has resulted from a search for those terms. Otherwise, the screen looks much the same as that of FIG. 10. However, by pressing the Flip Wiki™ command 930, the document referencing system application 200 takes the user from the document on the device or system library onto the open Internet. The application 200 flips the screen around, as shown in FIG. 26, and presents the user with a screen such as that on FIG. 27. This screen should look very familiar because it is preferably presented in the same format as the summarized search documents 1115 of FIG. 11, and the summarized news documents 2015 of FIG. 20. Here, application 200 provides summarized flip documents 2715, which are summaries of documents located on the Internet through the Flip Wiki™ tool relating to the subject of the document that was displayed or highlighted on user device 130 at the time the Flip Wiki™ command 930 was selected. When a specific summarized flip document 2715 is selected, the document referencing system application 200 presents to the user the full document as it appears on the Internet, but still using the document referencing system interface, as shown in FIG. 28. Flip documents 2715 may or may not already be in the system library. In cases where they are not, application 200 may download them and place them into the system library in a fashion such that they are associated with the document that was used to initiate the flip.

In some embodiments, the Flip Wiki™ may insert search terms from the document into known search engines, such as Google or Bing and simply present the top several results to the user through the document referencing system interface. However, in other embodiments, or where the user requests more specific action, the Flip Wiki™ feature may perform a more advanced service. For instance, it may search the document name in combination with the search terms that resulted in the document being displayed on user device 130 (i.e., "photograph" and "likeness" in FIG. 25). It may also serve a "metacrawler" function, where it searches the terms on various search engines and compiles the results. In some embodiments, application 200 can even selectively display the results according to certain algorithms enabled through character recognition and association. For example, it may only display results where the string "section 3344" is found at least three times. It may also automatically discard all restatements of the document being flipped that application 200 locates through its search. Obviously the user already has this content. Finally, it may give preference to certain flip documents 2715 based on their location on the Internet. For example, a flip document associated with an unrecognized blog website (that is, one not regularly reviewed by application 200 as an index topic 1710, etc.) may be weighted less heavily than a flip document from a government website. In addition, user preferences may establish criteria used by application 200 to determine what flip documents to present.

The text recognition and association capability of the document referencing system 100 has been discussed, but not fully disclosed. This may be used to enable some of the searching functionality discussed above, and is also used to recognize references within documents loaded into the document referencing system application 200 as discussed below. The text recognition and association capability is enabled through the use of a proprietary interpretation language called Multiplatform Interpreter for Regex Operations, or MIRO. As will be seen, the MIRO language can be used to create algorithms or scripts used by application 200 to locate citations within documents, and to associate those citations with the documents they reference. The basic building block of the MIRO language is Regular Expressions, or "Regex". A Regex is a known computing means for matching strings of text, and may be used to perform search and replace functions within a document. Regexes are used in a variety of programming languages, and Regex processor algorithms are freely available through open sources on the Internet. However, Regex is limited to executing simple find and replace or find and flag functions. It cannot be used to carry out complex instruction or logic sets, such as would be required to identify a citation within a document, associate that citation with a specific document, locate that document within a database or on the Internet, or create a link to the document embedded within the citation. Rather, these tasks must be completed using MIRO.

The MIRO interpretation language should not be confused with fully functional programming languages such as Java, C or Perl. Rather, it works in association with these languages, but separately within the document referencing system application 200. MIRO is used to generate a variety of rule sets. Each rule set contains a variety of rules used to identify citations within a document, for example. Each rule, in turn, may contain numerous Regex phrases known to a Regex processor. As the application 200 executes a scan of a document, the rules in the rule set are sequentially applied to recognize citations. An example of this process is discussed in association with FIG. 29.

Figure 29:
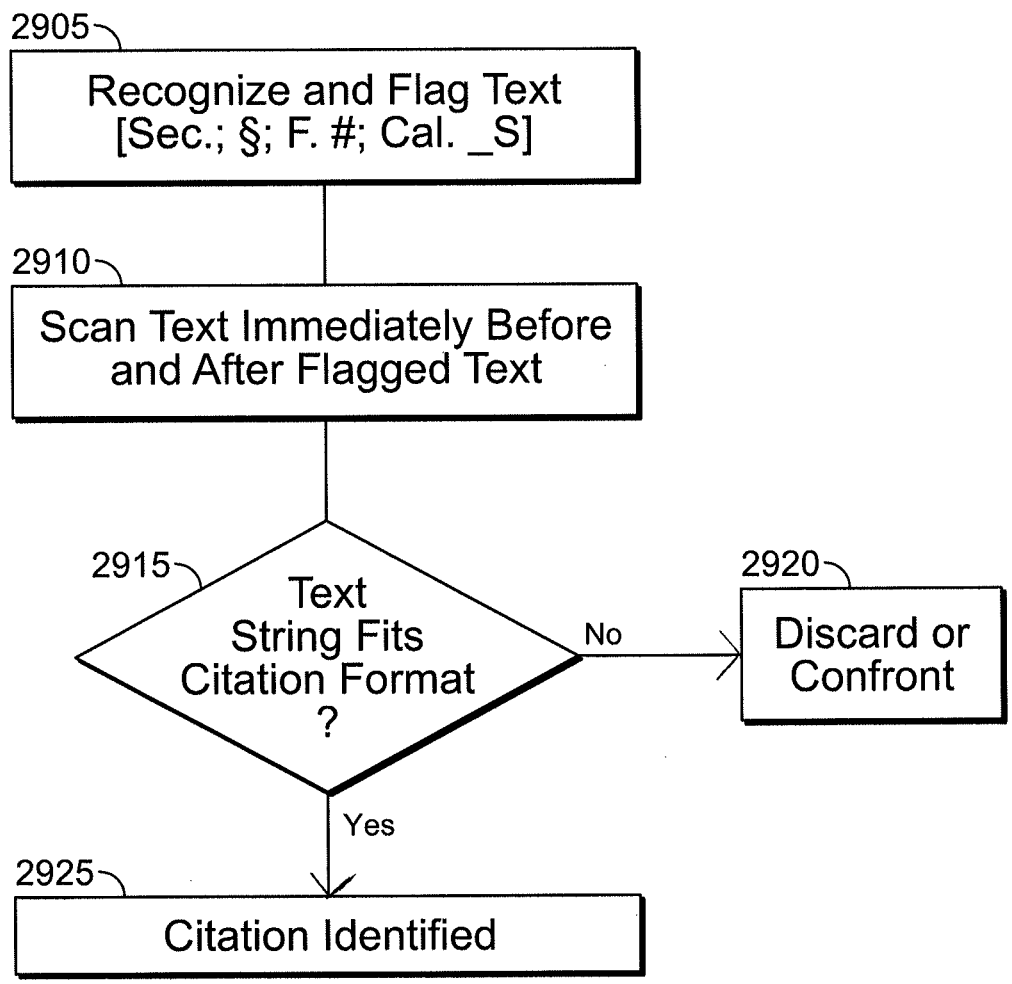
FIG. 29 is a flowchart showing steps taken by the document referencing system application to identify a reference to a second document from within a first document and to embed within the reference a link to the second document.

FIG. 29 depicts a flow chart representative of a rule set, and more specifically, a rule set for use with California legal documents. Once a new document is loaded into the document referencing system application 200 and the proper rule set is identified, the application scans the document for certain text identified in the first rule. In this case, at Step 2905, the application 200 is searching for the following text strings: "Sec.", "§", "F.#", and "Cal._S". Certain symbols may be used to identify multiple characters. For example, the "#" symbol can be satisfied with any numeric integer. Accordingly, "F.3" would satisfy the rule. Further, the "_" symbol may be used to denote a space between characters, such that "Cal. S" would satisfy the rule. The actual strings being searched will, of course, vary depending on the rule set. Here, they are designed to identify (1) cites to statutory code sections, which will likely include either "Sec." or "§", (2) cites to the Federal Reporter, which contain federal case law and uses the form ### F.#d ####, and (3) cites to the California Reporter, which contain California state case law and uses the form ### Cal. Supp. #d ###.

Once the application recognizes and flags the target text strings, it scans the text immediately around those text strings at Step 2910. This text is then analyzed to determine if a citation exists at Step 2915. This logic step may be done in any number of ways, and may comprise a number of different iterative rules. For example, the rule set may direct the application 200 to sequentially scan each successive character prior to the target text string until an expected citation format is satisfied. If the format is satisfied, the rule set directs the application 200 to do the same for the text following the target sting until a full citation format is met. If the format is not met, the application 20 will discard the text string and move on, or in some embodiments, may present the text string to the user for verification (see Step 2920).

For example, on a first pass, the application 200 might flag the text "Cal. S.", thus satisfying the first rule. It then begins to analyze each character prior to the flagged string until the ### Cal. S format is identified. If the actual text is "Berkely Cal. serves", the application would recognize that the format is not met and would discard the flagged text. However, if the actual test is "12 Cal. Street", the application would be satisfied with the text format preceding the flagged string and would proceed to analyze the text after the flagged string. In this case, the application 200 would be looking for the Cal. Supp. #d #### format, and, not finding it, would again discard the reference. However, were the actual text "12 Cal. Supp. 2d 1313", the format would be satisfied and the application 200 would mark the full text string as a citation (Step 2925). The rules can be written in a manner such that one or two detected numerals will satisfy a format allowing for three or four numerals, and so forth.

In some embodiments, application 200 may be configured to recognize where a potential citation comes very close to satisfying a format, but fails on a technicality. For instance, there may simply be a mistake in the optical scan, or in the actual text. If the application 200 recognizes "12 Cal.Supp2d 1313", the exact format is not met. However, the application may note that enough rules of the rule set have been satisfied such that the citation should be presented to the user in a separate window on user device 130 for verification. This window may allow the user to correct the citation. In other embodiments, application 200 may recommend a proper citation format based on the identified text and allow the user to accept, deny or alter the recommendation.

Figure 30:
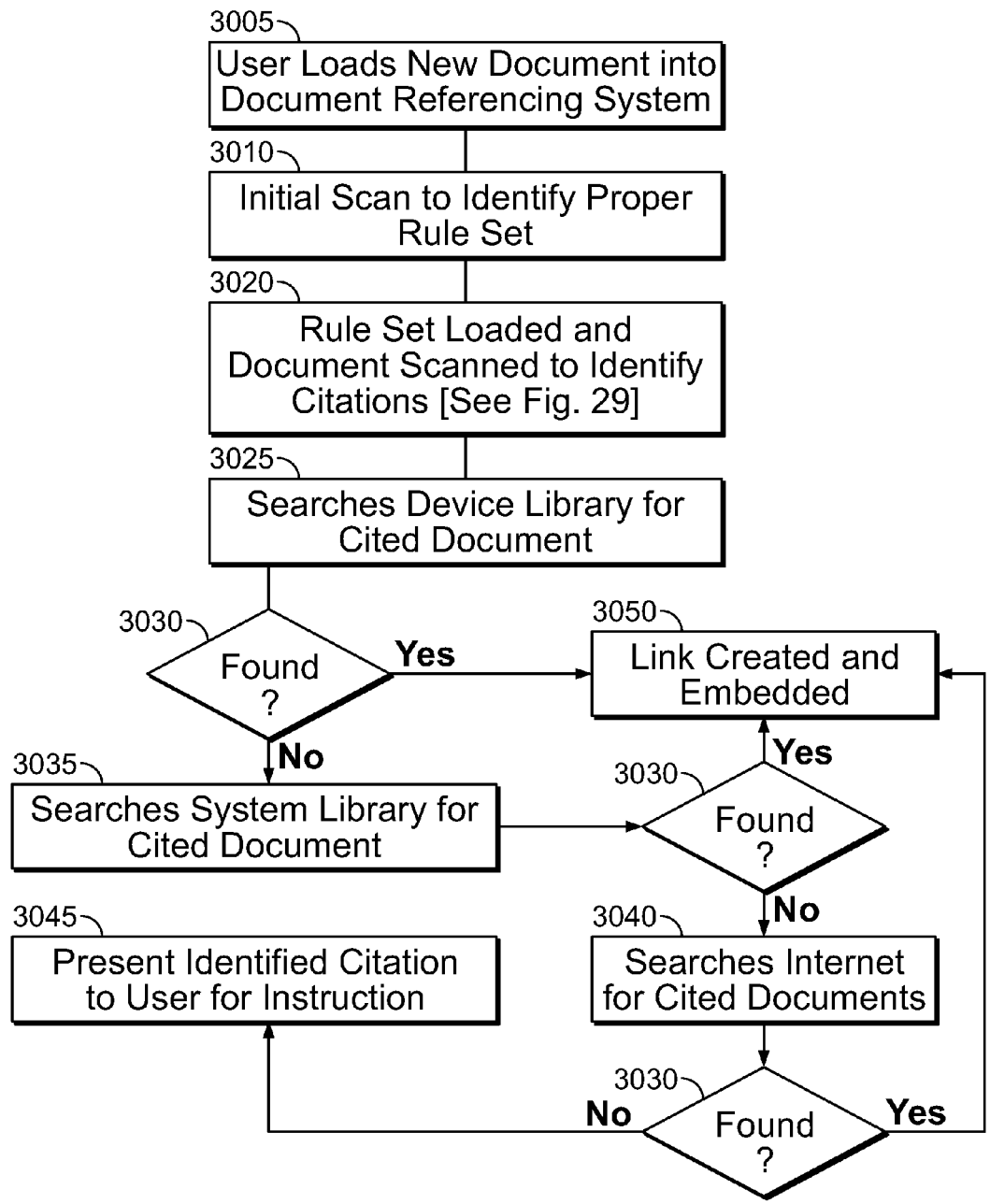
FIG. 30 is a flowchart showing steps taken by the document referencing system application to format an entire document so as to contain embedded links to all cited references therein.

In this manner, the document referencing system application 200 can scan through a document and recognize the citations in the document according to the proscribed rule set. However, that function is only a portion of the overall document linking process. FIG. 30 shows a flowchart depicting steps in the overall process at a high level. At Step 3005, a user loads a new document into the document referencing system 100. This document may be a document the user has located on the Internet, or that has been sent to him by a third party. Alternatively, it could be a document that the user has created. Though the example of FIG. 30 begins with the user introducing a document to the system 100, it will be understood that the process may be self-initiated by system 100 upon receiving a new document into the system library database 112, or upon encountering a new document through a search of index topics on the Internet, etc. Furthermore, in cases where the user provides the new document, the system 100 may self initiate the document linking process or may await a command from the user for it to do so.

Once the process is initiated, the first step is to identify the proper rule set to apply. It is important that document referencing system application 200 is applying the proper rule set to a given document, because MIRO rule sets are written with specific types of citations in mind, and with an expectation that the rule set will be used in association with documents having those types of citations. For example, the rules discussed in association with FIG. 29 above relate to a rule set specifically tailored to California legal documents, and designed to locate the types of citations expected to be found in such documents. Were this rule set applied to a document from another field such as engineering or medicine, it likely would not locate any citations. Were it applied to a New York legal document, it would likely locate some citations but miss others, and might incorrectly associate references to New York legal statutes with California law. Thus, choosing the proper rule set is an important first step.

In some cases, the rule set may be directed by the user, or may be based on the user's account profile. For example, if the user is identified as a California lawyer, and the user's device library contains only California legal reference sets, the default rule set would logically be one designed for recognizing California legal documents such as that in FIG. 29. Alternatively, if the user were a doctor, and the user's device library contained various medical references, document referencing system application 200 would select a default rule set designed to identify text strings associated with such medical references. Where there is no default rule set, or where it is desired to verify with the user that the default rule set is to be used, application 200 may present the user with a verification request, or query the user for information about the document. For example, the application may ask the user a series of questions such as: "Is this a legal document?", "Does it cover Federal law?", and "Is it specific to the laws of a particular state?".

In other embodiments, and as indicated in FIG. 30 at Step 3010, the document referencing system application 200 may perform an initial scan of the document to identify the best rule set. Each rule set can be given header tags that the application 200 can search for within the document. For example, the rule set referenced in FIG. 29 may have "California", "court" and "superior" as header tags. Where these tags are identified a sufficient number of times within the document during the initial scan, the application 200 may determine this to be an appropriate rule set. Even where this automated process is used, the application 200 may still be configured to verify its rule set selection with the user before proceeding.

Though the rule set selection process is very important, it should be understood that there will always be a rule set available for use. Where the user query process or the scan process described above are not able to identify a specific rule set for use with the document, a more general rule set will be used. However, the more broad a rule set is, the more complex it must be to cover all the potential citation formats. This not only slows the execution of the process described in FIG. 29, it is less likely to identify all of the citations. Where a more specific rule set tailored to the types of citations expected to be found in the document can be used, the execution and accuracy increases.

Once a rule set is settled upon, it is loaded in Step 3020, and the document is once again scanned to identify citations in accordance with the rule set, such as explained in association with FIG. 29 above. Once the citations are recognized and flagged, the document referencing system application 200 searches the user's device library on user device 130 to locate the cited reference (Step 3025). If the reference is found (Step 3030), the application 200 generates a hyperlink to the cited reference and embeds the link in the citation text within the document being scanned. In this manner, when the user reviews the document, the user may immediately call up the cited reference by clicking on or otherwise selecting the citation. No further search is necessary.

If the cited reference is not found in the device library, the application 200 proceeds to search the system library database 112 for the reference at Step 3035. Alternatively, in a group scenario where an intranet is used and an intermediate library is maintained on a common group server, the application 200 may first search this intermediate library before resorting to the system library. If necessary, most references will be found in the system library, and an appropriate link will be created as described above. When it is still not located, the application 200 may proceed to search the Internet using various search engines to locate the document at Step 3040. This process may or may not include submitting information to a paid reference consolidation database to obtain the reference. Where the reference is found, again a proper link is created and embedded at Step 3050. Though not shown in FIG. 30, the application 200 may be configured to download the reference into the system library in this case, and then create the link to the reference's new location within system library database 112. If the application 200 cannot locate the cited reference after searching the device library, the system library, and the Internet, the application will present the citation to the user for further instruction at Step 3045. Most likely in such cases, there is a problem with the format or content of the citation that the user may be able to identify and fix.

The embedded links created by application 200 may appear in different colors depending on the location of the cited reference. This will tell the user whether an Internet connection is necessary to obtain the documents. For example, green might be used for citations referring to references within the user's device library, while blue might be used for citations referring to references that must be obtained through the Internet. In addition, red may be used for citations referring to references that can only be obtained from paid sources, such that the user will understand that selecting the link may result in an additional charge.

While FIG. 30 illustrates an exemplary way that document referencing system application 200 can format documents and generate links from those documents to the references cited therein, it will be understood that other process steps could be taken to achieve a similar result without departing from the scope of the invention. For example, a general rule set could be applied to all references initially, thus obviating the need to scan and identify a specific rule set to be used. The general rule set would pick up the most standard of citation formats, and then the user could submit any additional, less standard citations of interest to a more complicated rule set matching algorithm that runs through a series of rule sets to find a match. Alternatively, the application 200 could only operate to identify and link citations upon a user request relating to an individual citation.

Yet another alternative would be for the application 200 to automatically link all equivalent (or short) citations within a document to the same reference once the initial citation is encountered. For example, a citation such as [Widmore, Charles J., "The Last of the MacCutcheon," Reader's Digest, Jan. 1970: 1-12.] might be initially located and linked to the corresponding reference in the journal located in the system library. The application 200 would then add to its scan function the string "Widmore" such that each time "Widmore" is identified throughout the document followed immediately by a number corresponding to a page within the reference, the same link would be generated without the need to execute the citation identification process, such as that of FIG. 29.

In this manner, any variety of documents containing references to other publicly available documents can be formatted for viewing and dynamically linked together. While the referenced documents generally need to be publicly available so as to conform to a citation format, the documents being operated on by the document referencing system 100 need not be. The documents that are formatted and scanned by the document referencing system application 200 can be created by the user, received from the user's colleagues, or obtained from other non-public sources. For example, the system 100 could be used by a small team of lawyers within a law firm to collaborate on the creation of a legal brief. As drafts are circulated, the system 100 is used to format them into a version where all cited references can immediately be accessed by the reviewing party.

Figure 31:
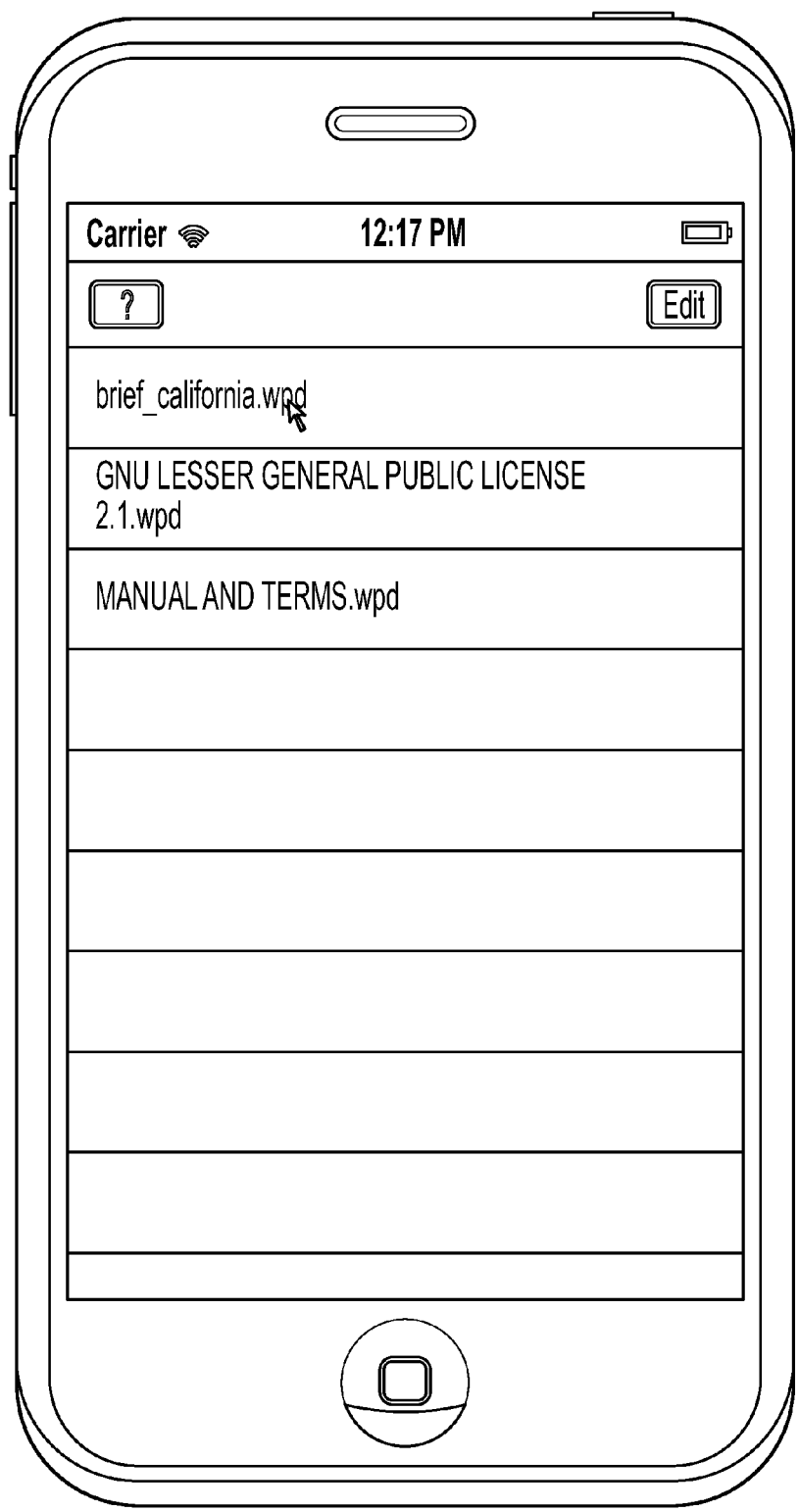
FIG. 31 is a screen shot of a user device operating the research system application that shows a document being loaded for reference linking, in accordance with a particular embodiment.
Figure 32:
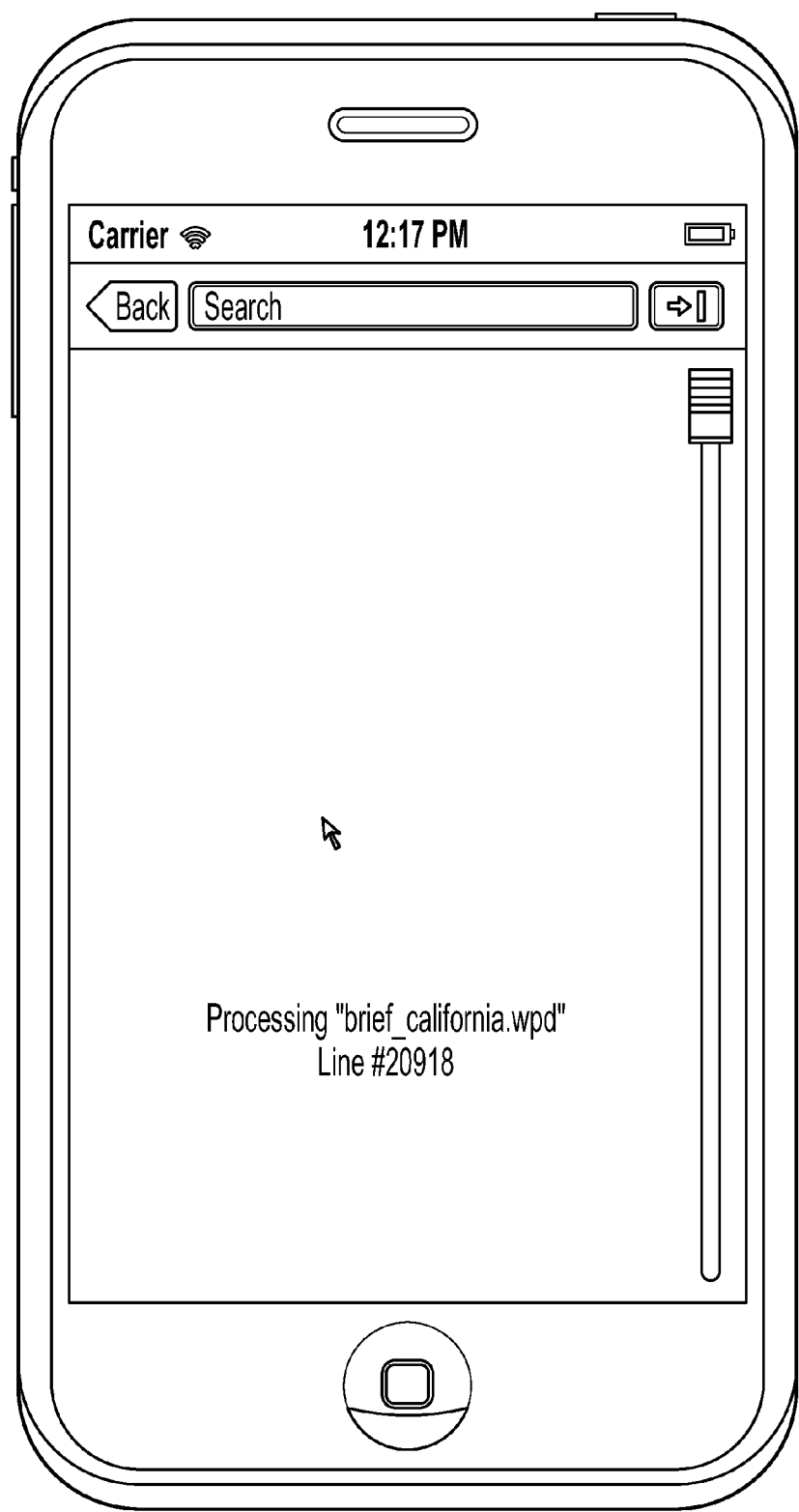
FIG. 32 is a screen shot of a user device operating the research system application that shows the document linking process operating on a document, in accordance with a particular embodiment.
Figure 33:
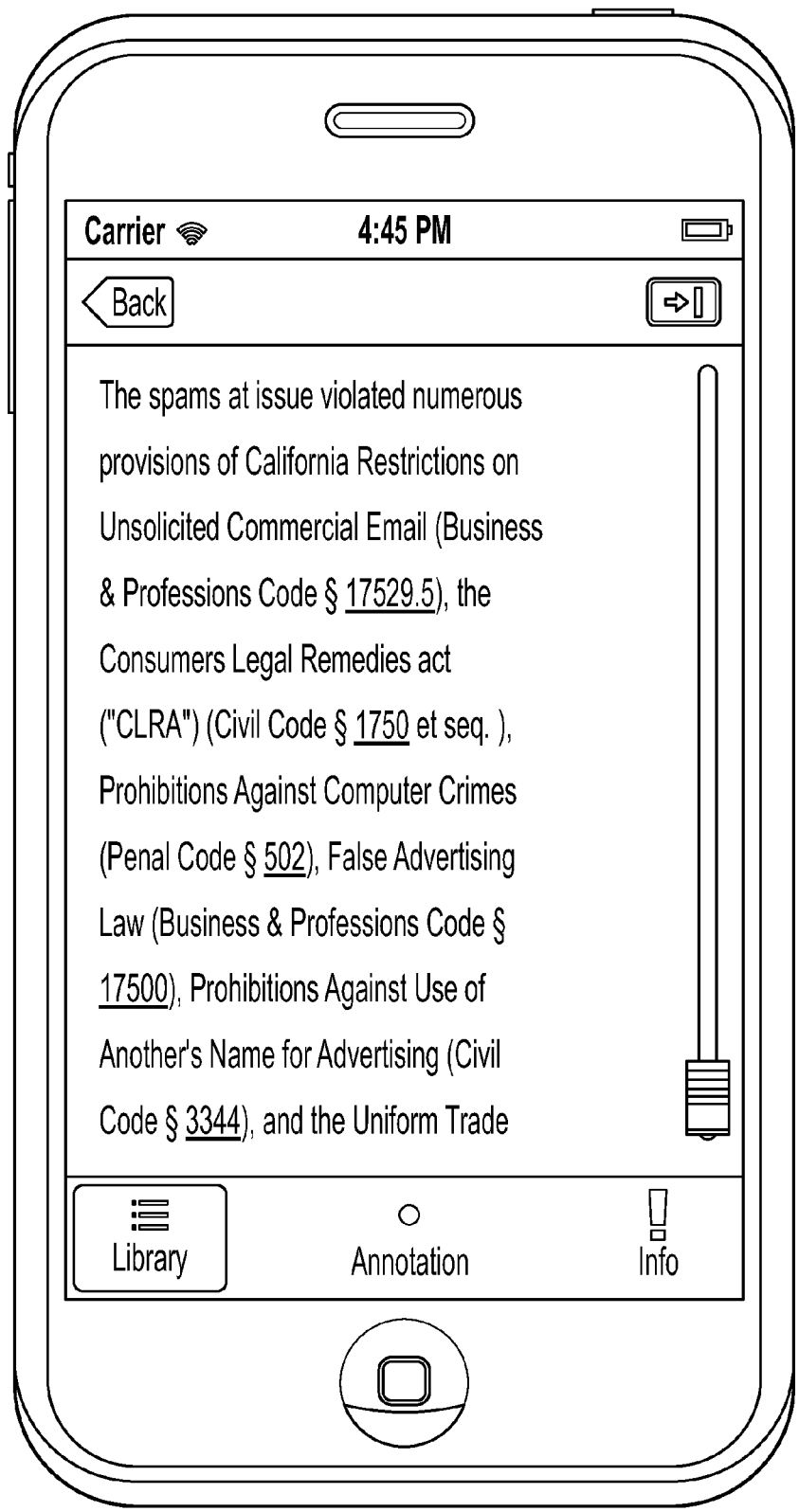
FIG. 33 is a screen shot of a user device operating the research system application that shows a document after the document linking process has identified and linked the references, in accordance with a particular embodiment.

FIG. 31 shows a screen where a user is viewing files stored on the user device 130 through the document referencing system interface. The interface can be used to search through files on the user device to identify and select documents compatible with document referencing system 100. As shown in FIG. 32, the user has selected a specific document, and application 200 is executing the formatting operation. Finally, in FIG. 33, the document is formatted on the screen as shown, with a portion of the document containing a reference that has been embedded with a hyperlink.

In other embodiments, the document referencing system 100 can be operated as a macro from within a third party software utility, such as, for instance, WORD PERFECT, WORD FOR WINDOWS, or ADOBE ACROBAT. In such a case, a document could be opened in the third party software environment, such as for further word processing. A user could then simply select an icon or operational button from a menu within the toolbar of the third party application in order to launch the document referencing system application 200, which would then proceed to scan and format the document to recognize and create links to references within the device and/or system libraries.

The document referencing system application 200 can also be directed to automatically prepare documents upon receipt to the system library such that all of the document's citations are identified and embedded with links to the appropriate references before they are ever viewed by a user or downloaded to a user device 130. Furthermore, because each user's device library is simply a subset of material within the system library, the device library content will also be pre-formatted in this same manner. This saves processing time at the user device 130, and provides a more valuable repository of references within the device and system libraries.

Figure 34:
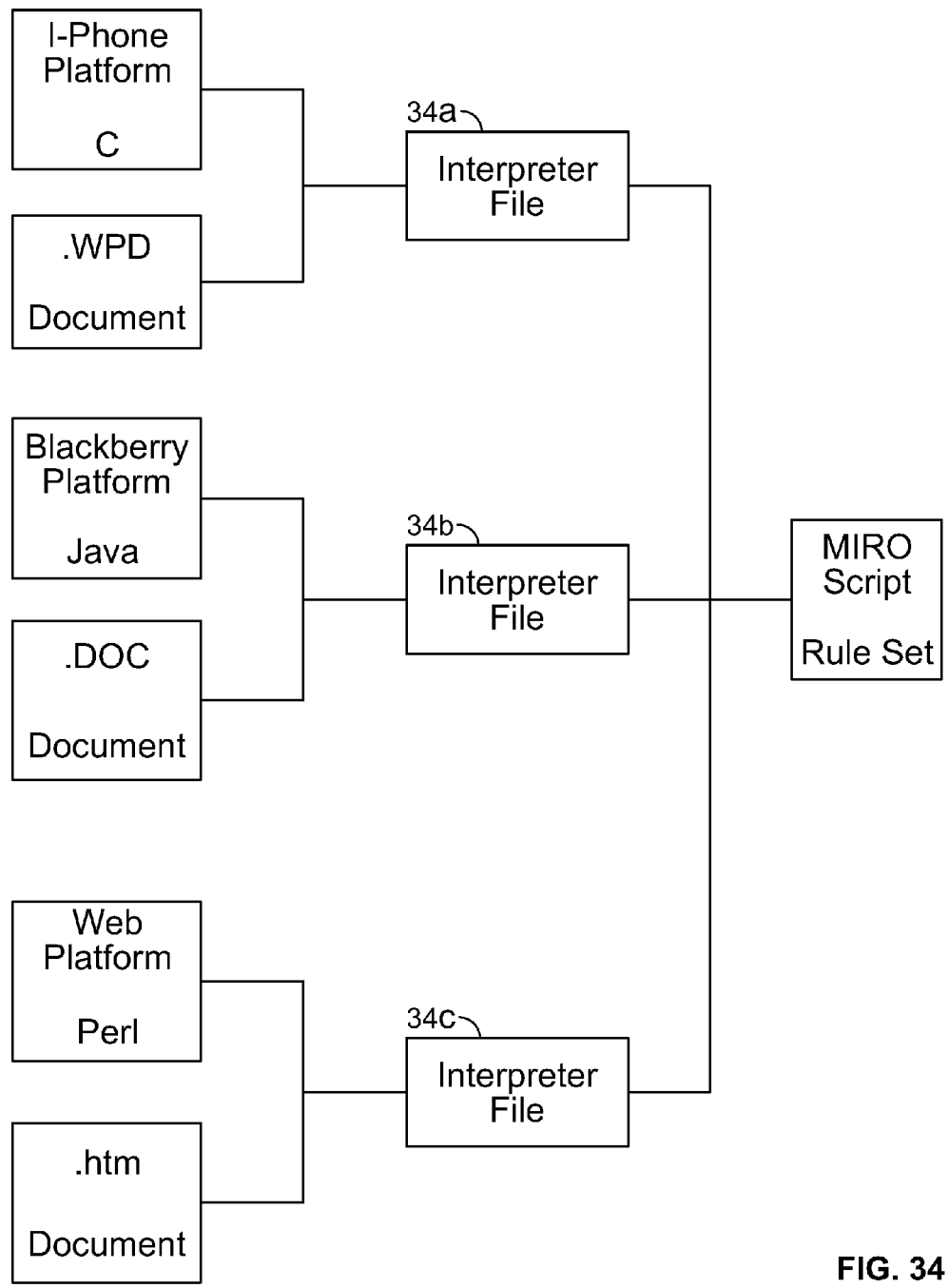
FIG. 34 is a schematic showing the interactions between a MIRO program for executing the document linking process and the software located on the various user device types.

Before leaving the topic of document formatting and dynamic linking of references, it should be noted that the MIRO language is not limited to operation with any specific type of user device or any specific document software. This is because the MIRO script is unique to the document reference system 100, and the associated application 200. In order for the application 200 to execute MIRO commands on a given device platform and document type, MIRO interpreter files are used. These files are a component of the core software that comprises application 200. As shown in FIG. 34, a MIRO interpreter file 34 is used by application 200 as an interface between the rule set written in MIRO script and the actual full-featured programming language of the device or internet webpage housing the document being formatted. Not only must the interpreter file 34 translate between the language of the device and the MIRO script, it must also account for the different document software programs. Thus, there may be a specific interpreter file 34*a* called upon when application 200 senses a .WPD (Word Perfect) document being viewed on an Apple I-Phone. This file 34*a* is specifically tailored to translate the MIRO script commands into a format that the document and device combination can process. However, that is the interpreter file's only purpose, and it could not be used with other devices.

In this manner, only a single MIRO script needs to be created for each rule set, regardless of what platform or language is used by user device 130 and regardless of the document type being formatted. For each new device type and document type to be supported, a new interpreter file is created, such as, for instance interpreter files 34*b* or 34*c*. The unique interpreter file then is used with all MIRO scripts operating on the given device type and document type. Similarly, for each new type of reference to be supported, a new rule set is created. That rule set is then used by all existing interpreter files. This modular programming scheme allows document referencing system 100 to seemlessly work in association with a variety types of user devices 130 and with various document types.

Accordingly, it should now be clear how the document referencing system 100 can be used by researchers, lawyers, doctors, engineers, or other professionals in a variety of ways to dynamically link numerous related documents and provide access to them in an efficient and logical fashion. A subscribing user can access the device library on their user device 130 at any time, and from any place, regardless of the presence of an Internet connection. The library can be searched in an hierarchical fashion so as to quickly identify the proper document from a small subset of possibilities. The system 100 further allows for a user to enter comments or notes relative to a given document or reference, and even search the library based on the comments entered and retained.

When an Internet connection becomes available, the device library may automatically be updated from the system library with the latest content to replace or add to the information in the device library. Accordingly, the user can have confidence that the information in the device library is accurate. The user may also share comments or entire references with friends or colleagues through email or social media networks with the push of a button. Also through the Internet, the user may access a wealth of information beyond user device 130 through the same application interface as is used to interact with the device library. This information may include references cited in a document being reviewed by the user, or may more broadly include news or writings related to one of any number of pre-designated index topics. Any documents obtained through the Internet or otherwise are presented in the same familiar, organized and searchable form. A user may also use the document being reviewed to help automatically guide the search for news or related materials not specifically cited through use of the Flip Wiki™ feature. This feature automatically gathers key information from the document being viewed and combs the Internet for similar, related material to present to the user through the application interface.

In addition to this functionality, the document referencing system 100 utilizes a proprietary interpretation language to scan and format documents so as to locate citations and convert them into hyperlinks. The hyperlinks direct the user device 130 to load the references cited in the formatted document. In this manner, document referencing system 100 converts from a simple tool for reading static documents to a powerful tool for converting static documents into dynamic documents that are part of a web of all of the other dynamic documents to which they are linked. With the accompanying device and system libraries and tools for gathering information from the Internet, the document referencing system can truly bring the research library to a user's fingertips.

It should be emphasized that the above-described exemplary embodiments of the present invention, and particularly any "preferred" embodiments, are possible examples of implementations, merely set forth for a clear understanding of the principles of the invention. For example, it will be understood that the present invention can be adapted to fields beyond law, medicine or those others described by way of example above. The fields of research or study are only limited by the content that might be maintained within the system library and the content of the various rule sets that may be created in accordance with the formats and methods described herein. Any process descriptions or blocks in the figures, such as FIGS. 4-5 and 29-30, should be understood as representing modules, segments, or portions of code which include one or more executable instructions for implementing specific logical functions or steps in the process, and alternate implementations are included within the scope of the embodiments of the present invention in which functions may be executed out of order from that shown or discussed, including substantially concurrently or in reverse order, depending on the functionality involved, as would be understood by those having ordinary skill in the art. Many other variations and modifications may be made to the above-described embodiments of the invention without substantially departing from the spirit and principles of the invention. All such modifications are intended to be included herein within the scope of this disclosure and the present invention and protected by the following claims.

What is claimed is:

1. A method for identifying within a first reference citations to other references and embedding hyperlinks within the first reference to the other references, the method comprising the steps of:

a computer processor performing an initial scan of the first reference to identify header tags indicative of a particular field to which the first reference relates;

the computer processor determining a rule set to apply from among a plurality of pre-existing rule sets based at least in part on the detection of one or more header tags from the initial scan, wherein the rule set comprises a grouping of logic-based rules tailored for use in identifying target terms or phrases commonly used to reference documents within the particular field;

the computer processor systematically applying the rule set to text strings within the first reference to identify a citation to a second reference;

searching within a user's device library housed on a user device to locate a copy of the second reference; and embedding a primary hyperlink to the second reference within the first reference when the second reference is located within the user's device library.

2. The method of claim 1, wherein the rule set is determined based at least in part on data received from the user about content within the first reference.

3. The method of claim 1, wherein the rule set is determined based at least in part on a user profile associated with the user device.

4. The method of claim 1, further comprising the steps of:

searching within a system library to locate a copy of the second reference when the second reference is not found in the user's device library; and embedding a secondary hyperlink to the second reference within the first reference when the second reference is located within the system library.

5. The method of claim 4, wherein the primary hyperlink is presented in a first color within the first reference and the secondary hyperlink is presented in a second color within the first reference.

6. The method of claim 1, further comprising the step of presenting a citation to a user for verification.

7. The method of claim 1, further comprising the step of automatically correcting a citation within the first reference when an error is detected by the computer processor.

8. The method of claim 1, further comprising the step of selecting an interpretation module for use with the rule set based at least in part on the user device operating system software.

9. The method of claim 1, wherein the header tags are further indicative of a particular reference set, and wherein the logic-based rules comprising the rule set are further tailored for use in identifying target terms or phrases commonly used to reference documents within the particular reference set.

* * * * *